United States Patent
Da Silva et al.

(10) Patent No.: US 11,902,843 B2
(45) Date of Patent: Feb. 13, 2024

(54) METHOD AND WIRELESS DEVICE FOR HANDLING HANDOVER

(71) Applicant: Telefonaktiebolaget LM Ericsson (publ), Stockholm (SE)

(72) Inventors: Icaro L. J. Da Silva, Solna (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 411 days.

(21) Appl. No.: 17/295,411

(22) PCT Filed: Nov. 25, 2019

(86) PCT No.: PCT/SE2019/051194
§ 371 (c)(1),
(2) Date: May 19, 2021

(87) PCT Pub. No.: WO2020/112011
PCT Pub. Date: Jun. 4, 2020

(65) Prior Publication Data
US 2022/0007246 A1    Jan. 6, 2022

Related U.S. Application Data

(60) Provisional application No. 62/772,104, filed on Nov. 28, 2018.

(51) Int. Cl.
*H04W 36/00* (2009.01)
*H04W 36/30* (2009.01)
(Continued)

(52) U.S. Cl.
CPC . *H04W 36/00837* (2018.08); *H04W 36/0058* (2018.08); *H04W 36/08* (2013.01); *H04W 36/305* (2018.08); *H04W 48/20* (2013.01)

(58) Field of Classification Search
CPC ....... H04W 36/00837; H04W 36/0058; H04W 36/08; H04W 36/305; H04W 48/20;
(Continued)

(56) References Cited

U.S. PATENT DOCUMENTS

| | | | |
|---|---|---|---|
| 2014/0120921 A1* | 5/2014 | Keskitalo | H04W 36/305 455/438 |
| 2015/0373602 A1 | 12/2015 | Hampel et al. | |
| 2020/0120566 A1* | 4/2020 | Miao | H04W 36/08 |

FOREIGN PATENT DOCUMENTS

| | | |
|---|---|---|
| WO | WO 2012/176010 A2 | 12/2012 |
| WO | WO 2018/031603 A1 | 2/2018 |

(Continued)

OTHER PUBLICATIONS

Vivo, Signaling procedure for conditional handover, 3GPP TSG-RAN WG2 Meeting #104, Spokane, USA, Nov. 12-16, 2018, R2-1816334 (Year: 2018).*

(Continued)

*Primary Examiner* — Shailendra Kumar
(74) *Attorney, Agent, or Firm* — Sage Patent Group

(57) ABSTRACT

A method and a wireless device are provided for handling handover in a wireless network from a source cell to a target cell when the device has obtained and stored a handover configuration for at least one target cell X. Upon detecting a communication failure, the wireless device performs cell selection and initiates handover to one of the target cell(s) X when that cell was selected, by applying the stored handover configuration of the selected cell. When none of the target cell(s) X was selected in the cell selection, the wireless device initiates an RRC re-establishment procedure.

11 Claims, 16 Drawing Sheets

(51) Int. Cl.
*H04W 36/08* (2009.01)
*H04W 48/20* (2009.01)

(58) Field of Classification Search
CPC ....... H04W 36/0079; H04W 36/00835; H04W 76/19; H04W 36/0061
See application file for complete search history.

(56) References Cited

FOREIGN PATENT DOCUMENTS

| WO | WO-2018031603 A1 | * | 2/2018 | ............ H04W 36/08 |
| WO | WO 2018/171941 A1 | | 9/2018 | |

OTHER PUBLICATIONS

International Search Report and Written Opinion of the International Searching Authority, PCT/SE2019/051194, dated Feb. 4, 2020, 11 pages.

VIVO, 3GPP TSG-RAN WG2 Meeting #104, R2-1816334, "Signaling procedure for conditional handover," Spokane, USA, Nov. 12-16, 2018, 4 pages.

VIVO, 3GPP TSG-RAN WG2 Meeting #103bis, R2-1814194, "Signaling procedure for conditional handover," Chengdu, China, Oct. 8-12, 2018, 4 pages.

ETSI MCC, 3GPP TSG-RAN WG2 Meeting #105, R2-1900002, "Report of 3GPP TSG RAN2#104 Meeting", Spokane, USA, Nov. 12-16, 2018, 284 pages.

3GPP TS 38.300 v15.3.1 (Oct. 2018), $3^{rd}$ Generation Partnership Project; Technical Specification Group Radio Access Network; NR; NR and NG-RAN Overall Description; State 2 (Release 15), 92 pages.

ETSI TS 138 331 v15.3.0 (Oct. 2018), 5G; NR; Radio Resource Control (RRC); Protocol specification (3GPP TS 38.331 version 15.3.0 Release 15), 441 pages.

Extended European Search Report for European Application No. 23183314.6 dated Nov. 3, 2023, 11 pages.

* cited by examiner

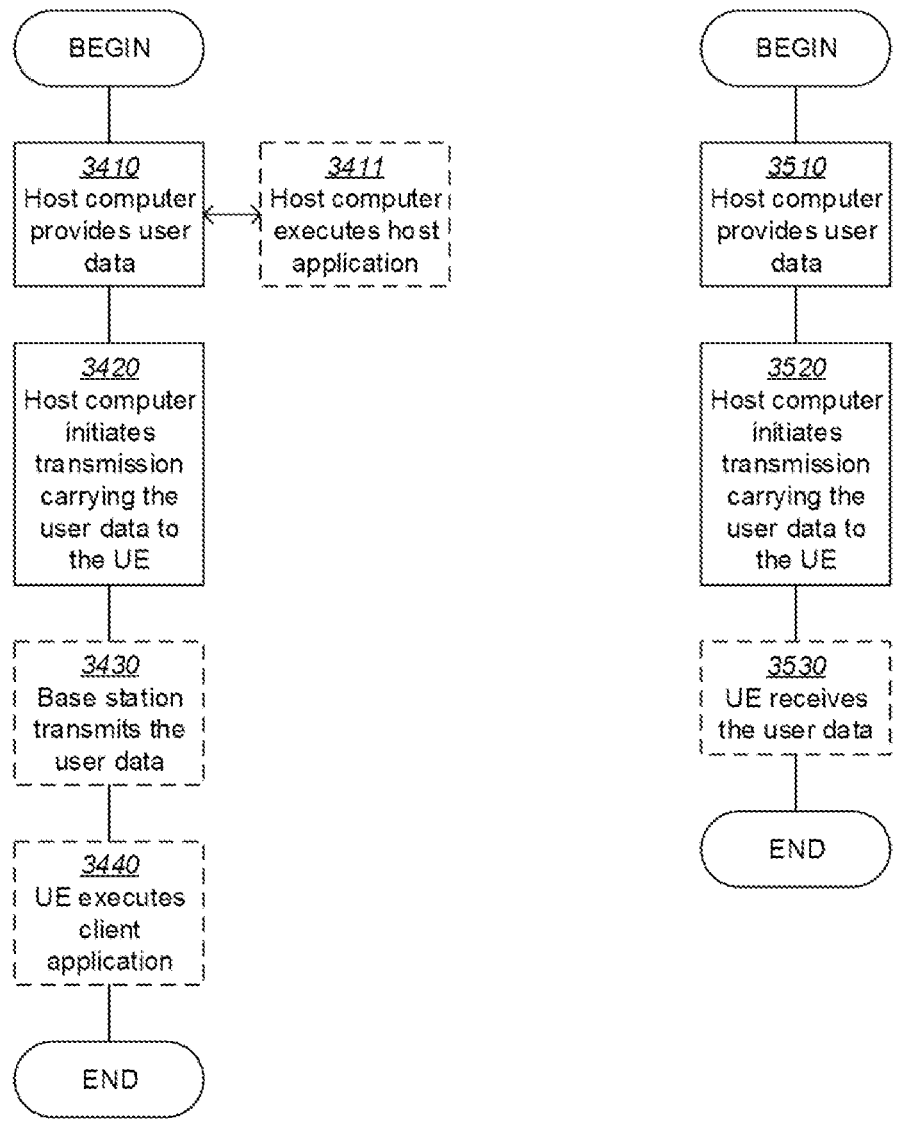

METHOD AND WIRELESS DEVICE FOR HANDLING HANDOVER

CROSS REFERENCE TO RELATED APPLICATIONS

This application is a 35 U.S.C. § 371 national stage application of PCT International Application No. PCT/SE2019/051194 filed on Nov. 25, 2019, which in turns claims domestic priority to U.S. Provisional Patent Application No. 62/772,104, filed on Nov. 28, 2018, the disclosures and content of which are incorporated by reference herein in their entirety.

TECHNICAL FIELD

The present disclosure relates generally to a method and a wireless device for handling a handover from a source cell to a target cell.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device. This disclosure is thus not limited to any particular wireless device or UE, as long as it is capable of radio communication and of executing a handover from one access point to another.

Further, the term "network node", is used herein to represent any node or access point of a wireless network that is operative to communicate radio signals with wireless devices. For example, the wireless network may be operating according to Long Term Evolution LTE or according to 5G, also referred to as "New Radio" NR, both being defined by the third Generation Partnership Project, 3GPP. The network nodes herein may refer to base stations, eNBs, gNBs, ng-eNBs, access points, etc., depending on the terminology used, although this disclosure is not limited to these examples. The node ng-eNB is defined for 5G in the 3GPP document TS38.300 section 3.

A protocol known as Radio Resource Control, RRC, defined by 3GPP is used on the air interface between a wireless device and a wireless network, e.g. operating according to the Universal Mobile Telecommunications System, UMTS, or Long Term Evolution, LTE. Among other things, RRC is used to control handover and cell selection procedures, including when a wireless device switches its network connection from a current cell, referred to as "source" cell, to a new cell, referred to as "target" cell.

A considerable amount of signaling is normally required between the wireless device and the wireless network in preparation for a handover, and it may sometimes be problematic that this signaling causes delays so that the handover may not have time to be completed before the wireless device loses contact with the source cell, e.g. due to rapidly worsening radio conditions. In this description, communicating data and messages with a source or target "cell" is to be understood as communication with a network node that provides radio coverage in that cell. The term radio conditions basically refers to quality and strength of received radio signals and also the amount of interference from other transmissions.

SUMMARY

It is an object of embodiments described herein to address at least some of the problems and issues discussed herein. It is possible to achieve this object and others by using a method and a wireless device as defined in the attached independent claims.

According to one aspect, a method is performed by a wireless device when operating in a wireless network, for handling handover from a source cell to a target cell when the wireless device has obtained and stored a handover configuration for at least one target cell X. In this method, the wireless device performs cell selection upon detecting a communication failure, such as e.g. handover failure, radio link failure, and failure to comply with a configuration for accessing the wireless network. The wireless device then initiates handover to one of the at least one target cell X when that target cell was selected in said cell selection, by applying the stored handover configuration of the selected cell. On the other hand, when none of the at least one target cell X was selected in said cell selection, the wireless device initiates an RRC re-establishment procedure.

According to another aspect, when operating in a wireless network, a wireless device is arranged to handle handover from a source cell to a target cell when the wireless device has obtained and stored a handover configuration for at least one target cell X. The wireless device is configured to perform cell selection upon detecting a communication failure, which may be performed by means of a cell selection module in the wireless device.

The wireless device is also configured to initiate handover to one of the at least one target cell X when that target cell was selected in said cell selection, by applying the stored handover configuration of the selected cell. This operation may be performed by means of a handover module in the wireless device.

The wireless device is further configured to initiate an RRC re-establishment procedure when none of the at least one target cell X was selected in the above cell selection, which initiation operation may be performed by means of an RRC re-establishment module in the wireless device.

When using either of the above method and wireless device, it is an advantage that the amount of signaling over the air can be greatly reduced when the device selects a target cell with a handover configuration that has already been obtained and stored by the device, and this handover configuration is thus not necessary to be obtained in an RRC re-establishment procedure after the cell selection. By omitting the time-consuming RRC re-establishment procedure after the cell selection, signaling and delays caused by the handover operation are reduced and the risk for losing the connection before handover completion is thus also reduced. It is also an advantage that the wireless device is able to easily decide whether to use an already stored handover configuration or initiate an RRC re-establishment procedure, depending on whether the selected target cell is amongst the one(s) for which the wireless device has stored handover configurations or not, thereby saving signaling and reducing delay whenever possible.

The above method and wireless device may be configured and implemented according to different optional embodiments to accomplish further features and benefits, to be described below.

A computer program is also provided comprising instructions which, when executed on at least one processor in the above wireless device, cause the at least one processor to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which:

FIGS. 11-16 illustrate further scenarios, structures and procedures that may be employed when the solution is used, according to further possible embodiments.

DETAILED DESCRIPTION

The solution will now be described and explained in terms of functionality in a wireless device which is operable in a wireless network for handling handover from a source cell to a target cell when the wireless device has obtained and stored a handover configuration for at least one target cell X, which may also be referred to as candidate cells. In this disclosure, the terms target cell and candidate cell are used interchangeably. It is assumed that a cell is served by a network node. Hence, when it is mentioned herein that a cell performs some activity or operation, it means that it is a network node of the cell that actually performs the activity or operation.

Figure 1:
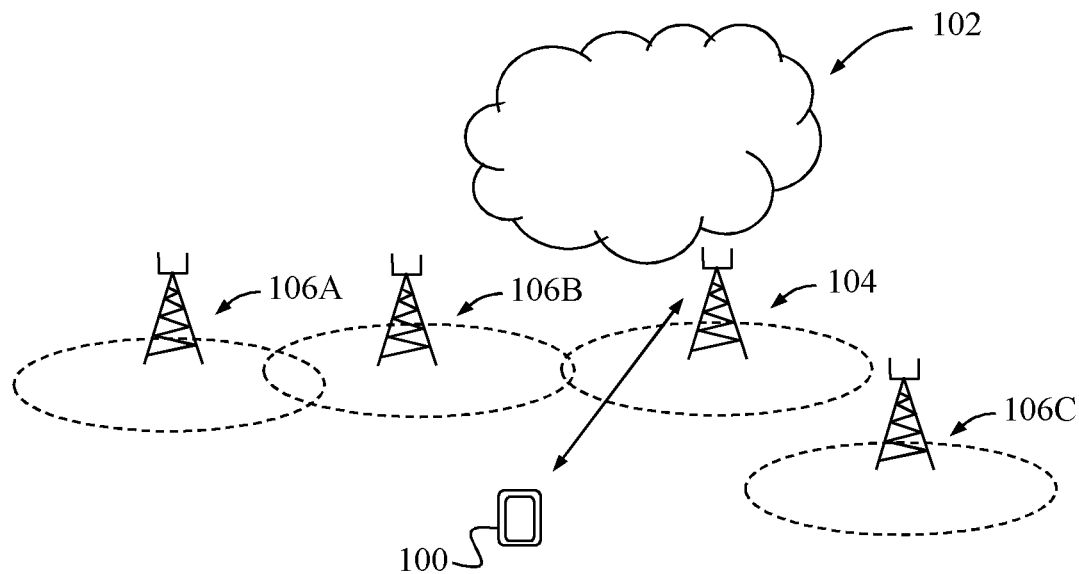
FIG. 1 illustrates a communication scenario involving a wireless device in a wireless network, where the examples and embodiments described herein may be used.

FIG. 1 illustrates a communication scenario where the examples and embodiments described herein may be used. A wireless device 100 is shown to operate in a wireless network 102, and communicates currently with a serving network node covering a serving cell 104, also referred to as a source cell which term will be used herein. Some other nearby cells likewise covered and served by network nodes are also shown in the figure, denoted 106A-C, which can be seen as potential candidates, i.e. target cells, for handover of the device 100. In this description, the term cell should be understood broadly as a radio coverage area covered and served by a network node which thus can provide communication services to wireless devices located in the cell. The cells in this figure are schematically indicated by dashed lines which in reality may have any forms and shapes such as circles, sectors and beams.

According to conventional procedures, the wireless device 100 performs measurements on signals transmitted from the cells 104, 106A-C and reports the measurements to the serving node of cell 104, which node then may decide that the wireless device should be handed over to a target cell that can provide better reception of signals than the source cell 104.

In some of the examples and embodiments herein, so-called Radio Link Failure, RLF, is used as an example of communication failure which implies that the radio link in the serving cell 104 is not good enough to be used for the communication between the device 100 and the network 102, commonly also referred to as "bad" radio conditions. However, the examples and embodiments herein are not limited to the occurrence of RLF but could be employed also at other types of communication failure such as, e.g., handover failure and failure to comply with a configuration for accessing the wireless network.

In order to execute such a commanded handover to a target cell, e.g. to one of cells 106A-C, the wireless device 100 needs to obtain various configuration information that should be used for accessing the target cell. Such configuration information related to the target cell, herein also referred to as "handover configuration" which may comprise an RRC configuration, is usually transmitted from the source cell 104 in a handover command to the device 100, i.e. after the reported measurements have been evaluated and the handover decision has been taken.

However, it may happen that the current connection to the source cell 104 is rapidly deteriorated so much that the wireless device 100 is not able to properly receive and detect the configuration information in the handover command. As a result, the device 100 is not able to access the target cell in time and the handover thus fails. This can be solved by utilizing a handover configuration for at least one target cell X which has been obtained and stored in advance by the device 100, e.g. when transmitted from the source cell 104, well before any handover procedure has been decided and initiated. Thereby, the wireless device 100 can opportunistically select one of the candidate or target cells X for which a handover configuration has already been obtained and stored, and access the selected target cell using the stored handover configuration without having to receive the configuration in a handover command from the source cell 104. Changing connection in this way without a handover command from the network may be called an opportunistic handover as initiated by the wireless device 100.

Figure 2:
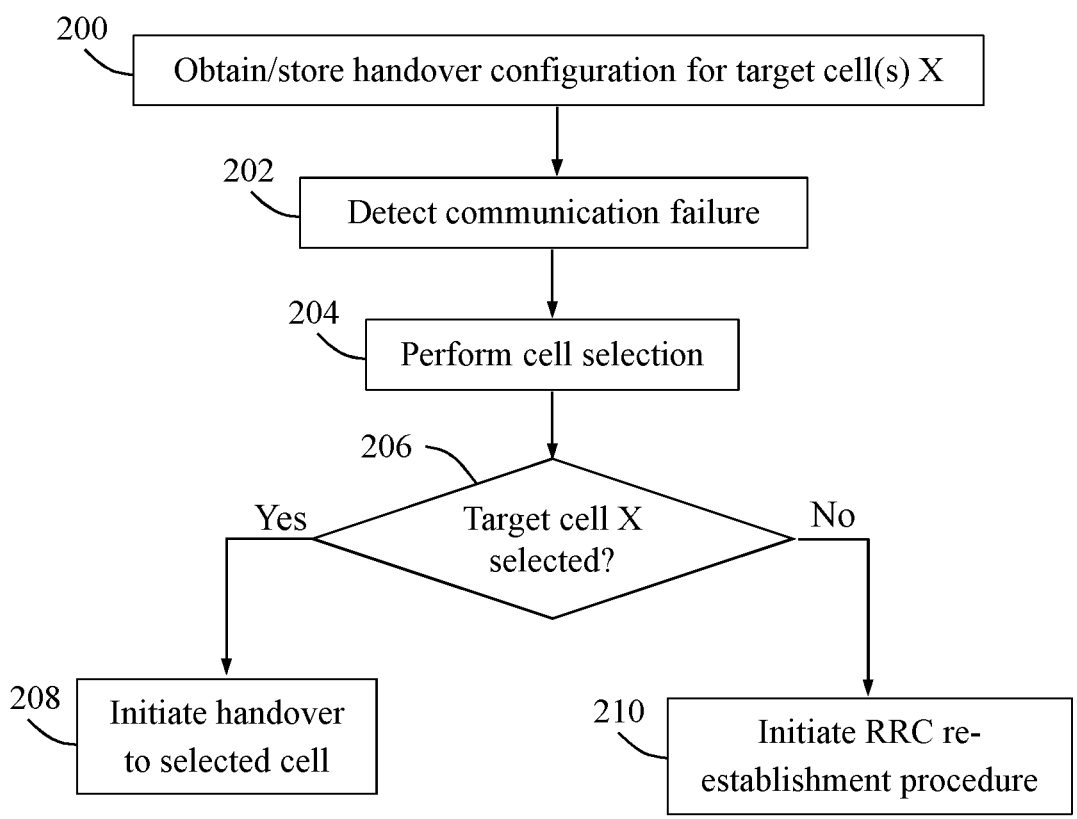
FIG. 2 is a flow chart illustrating a procedure in a wireless device, according to some example embodiments.

An example of how the solution may be employed in terms of actions performed by a wireless device such as the wireless device 100, is illustrated by the flow chart in FIG. 2 which will now be described with further reference to FIG. 1, although this procedure is not limited to the example of FIG. 1. FIG. 2 thus illustrates a procedure in the wireless device 100 when operating in a wireless network 102, for handling handover from a source cell 104 to a target cell, e.g. one of cells 106A-C.

A first action 200 illustrates that the wireless device 100 obtains and stores a handover configuration for at least one target cell X, e.g. for the cells 106A-C, which may be done by signaling with the currently serving network node of cell 104 preferably at a time when the radio link is "good", that is before it might become worse resulting in RLF. Each of the stored handover configuration(s) may be an RRC configuration comprising an RRCReconfiguration with reconfigurationWithSync or an RRCConnectionReconfiguration with mobilityControlInfo.

In another action 202, the wireless device 100 further detects a communication failure which basically implies that it is necessary, or at least better, to change connection to another cell, for whatever reason. The communication failure in this context will often be referred to as a "failure" for short in the following text.

In another action 204, the wireless device 100 performs cell selection upon detecting a communication failure in action 202. Cell selection is a well-known procedure as such and is basically executed by comparing the quality and/or signal strength of radio signals transmitted from respective candidate cells. It is then basically determined in an action 206 whether the cell selected in action 204 is one of the at least one target cell X for which a handover configuration was obtained and stored in action 200.

Depending on the outcome of action 206, either of actions 208 and 210 will next be performed. Action 208 illustrates that the wireless device 100 initiates handover to one of the at least one target cell X 106A-C in case that target cell was selected in said cell selection (i.e. yes in action 206), by applying the stored handover configuration of the selected cell. Thereby, the wireless device 100 can save signaling and reduce the delay by omitting the RRC re-establishment procedure since it opportunistically initiates handover immediately to one of the target cells X 106A-C for which a handover configuration has been respectively obtained and stored by the device 100 in action 200.

On the other hand, action 210 illustrates that the wireless device 100 initiates an RRC re-establishment procedure in case none of the at least one target cell X was selected in said cell selection (i.e. no in action 206). The latter action thus means that no handover configuration of the selected cell is available in the wireless device 100 since it was not included in the configurations stored in action 200. The RRC re-establishment procedure will be described in more detail later below.

Some further examples of embodiments that may be employed in the above procedure in FIG. 2 will now be described. In one example embodiment, the stored handover configuration(s) may be so-called conditional handover configuration(s). Conditional handover means basically that a handover command is associated with a condition that must be fulfilled before a handover is triggered or initiated. For example, the condition may be based on radio conditions by requiring that signals from a certain neighbor or candidate cell becomes 'X' dB better than the signals from the serving cell. As soon as the condition is fulfilled, the wireless device executes the handover in accordance with the provided handover command. Conditional handover will be explained in more detail later below.

In some non-limiting further example embodiments, the above-mentioned communication failure detected in action 202 may comprise any of: handover failure, radio link failure (RLF), and failure to comply with a configuration for accessing the wireless network. These examples of communication failure will be further discussed later below.

In another example embodiment, the above communication failure may be declared when a predefined timer expires, which timer has been started when the communication failure was first detected. In more detail, the wireless device 100 in this embodiment starts the timer as soon as a communication failure, such as any of the above-mentioned communication failures, has been noticed or detected. If the communication failure still remains after the timer has expired, the wireless device 100 will proceed to perform cell selection in action 204, and so forth. If the communication failure has vanished when the timer expires, it is no longer necessary to change cell by performing a handover and the device 100 can remain connected to the source cell 104.

Figure 3:
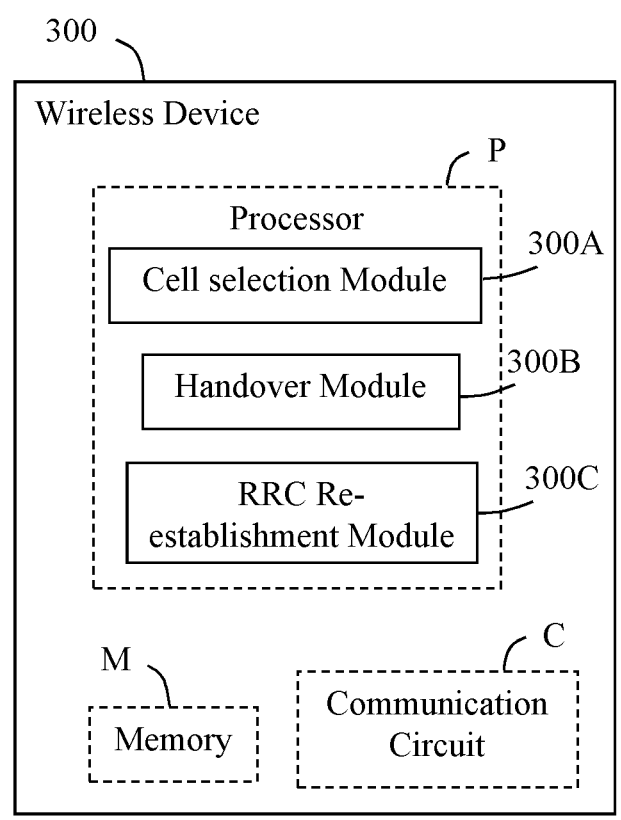
FIG. 3 is a block diagram illustrating how a wireless device may be structured, according to further example embodiments.

The block diagram in FIG. 3 illustrates a detailed but non-limiting example of how a wireless device 300 may be structured to bring about the above-described solution and embodiments thereof. In this figure, the wireless device 300 may be configured to operate according to any of the examples and embodiments of employing the solution as described herein, where appropriate, e.g. in the manner described for the wireless device 100. The wireless device 300 is shown to comprise a processor "P", a memory "M" and a communication circuit "C" with suitable equipment for transmitting and receiving information and messages in the manner described herein.

The communication circuit C in the wireless device 300 thus comprises equipment configured for communication using a suitable protocol for the communication depending on the implementation. The solution is however not limited to any specific types of messages or protocols.

The wireless device 300 is, e.g. by means of units, modules or the like, configured or arranged to perform at least some of the actions of the flow chart in FIG. 2 and as follows. The wireless device 300 may further correspond to the above-described wireless device 100 of FIG. 1.

The wireless device 300 is arranged to, when operating in a wireless network, handle handover from a source cell to a target cell when the wireless device has obtained and stored a handover configuration for at least one target cell X, such as the cells 106A-C shown in FIG. 1. The wireless device 300 is configured to perform cell selection upon detecting a communication failure. This operation may be performed by a cell selection module 300A in the wireless device 300, as also illustrated in action 204.

The wireless device 300 is also configured to initiate handover to one of the at least one target cell X in case that target cell was selected in said cell selection, by applying the stored handover configuration of the selected cell. This operation may be performed by a handover module 300B in the wireless device 300, as also illustrated in action 208. The handover module 300B could alternatively be named a handover initiating or executing module.

The wireless device 300 is further configured to initiate an RRC re-establishment procedure in case none of the at least one target cell X was selected in said cell selection. This operation may be performed by an RRC re-establishment module 300C in the wireless device 300, as also illustrated in action 306.

It should be noted that FIG. 3 illustrates various functional modules in the wireless device 300 and the skilled person is able to implement these functional modules in practice using suitable software and hardware equipment. Thus, the solution is generally not limited to the shown structure of the wireless device 300, and the functional modules therein may be configured to operate according to any of the features, examples and embodiments described in this disclosure, where appropriate.

The functional modules 300A-C described above may be implemented in the wireless device 300 by means of program modules of a computer program comprising code means which, when run by the processor P causes the wireless device 300 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the wireless device 300 in the form of a memory having a computer readable medium and being connected to the processor P. The computer program product or memory M in the wireless device 300 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the wireless device 300.

The solution described herein may be implemented in the wireless device 300 by a computer program comprising instructions which, when executed on at least one processor, cause the at least one processor to carry out the actions according to any of the above embodiments and examples, where appropriate. The solution may also be implemented at the wireless device 300 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "wireless device", "network node", "conditional handover", "handover configuration", "communication failure", "target cell", "cell selection" and "RRC re-establishment procedure" have been used throughout this disclosure, although any other corresponding entities, functions, and/or parameters could also be used having the features and characteristics described here. The solution may for example be defined by the appended claims.

The above mentioned problem of not obtaining the necessary configuration information in time will now be described in more detail. Some currently available procedures will also be described. In the following, the above wireless device 100 or 300 will frequently be referred to as a UE for short and the terms wireless device and UE are thus basically synonyms and used herein interchangeably. Further, handover is often referred to as HO for short. The term RAT used below denotes Radio Access Technology.

Mobility in a so-called RRC_CONNECTED state according to LTE and NR will now be described.

A connected wireless device, such as an RRC_CONNECTED UE in LTE (also called Evolved Universal Terrestrial Radio Access, E-UTRA), can thus be configured by the network to perform measurements and triggers for transmitting measurement reports to the network. Upon reception of the measurement reports, the network may send a handover command to the device/UE. In LTE the handover command may be a message called RRCConnectionReconfiguration provided with a field called mobilityControlInfo, and in NR the handover command may be a message called RRCReconfiguration provided with a field called reconfigurationWithSync.

These reconfigurations are actually prepared by the target cell upon an inter-node request from the source node e.g. over an X2 interface in case of E-UTRA/Evolved Packet Core, EPC, or over an Xn interface in case of E-UTRA/5GC or NR, and takes into account the existing RRC configuration the device/UE has with the source cell (which are provided in the inter-node request). Among other parameters, the reconfiguration provided by the target node contains all information the UE needs to access the target cell, e.g. including random access configuration, a new Cell Radio Network Temporary Identifier, C-RNTI, assigned by the target cell and security parameters enabling the UE to calculate new security keys associated to the target cell so the UE can send a handover complete message on a Signaling Radio Bearer called SRB1 (encrypted and integrity protected) based on new security keys upon accessing the target cell.

Figure 4A:
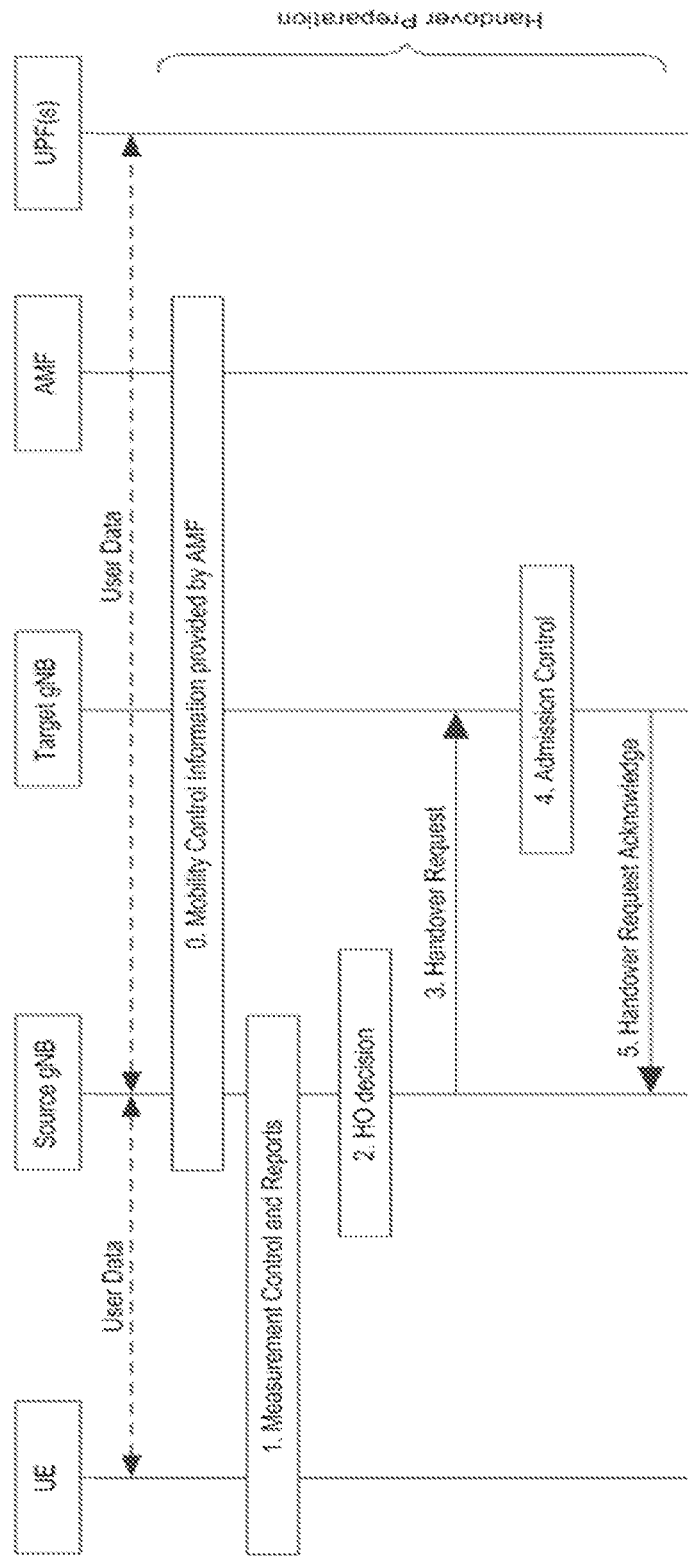
FIGS. 4A-C is a signaling diagram illustrating a conventional handover procedure for a wireless device from a source gNB to a target gNB.
Figure 4B:
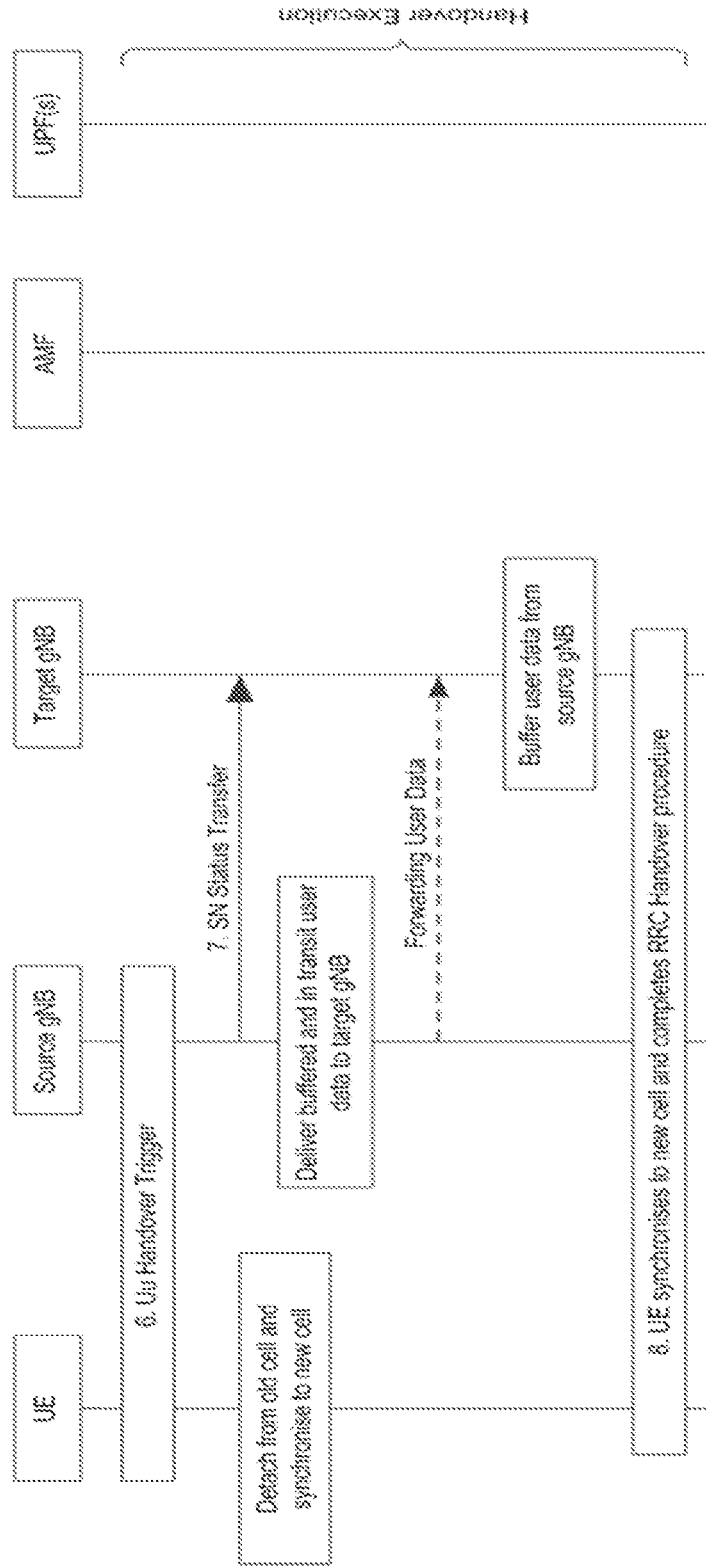
Figure 4C:
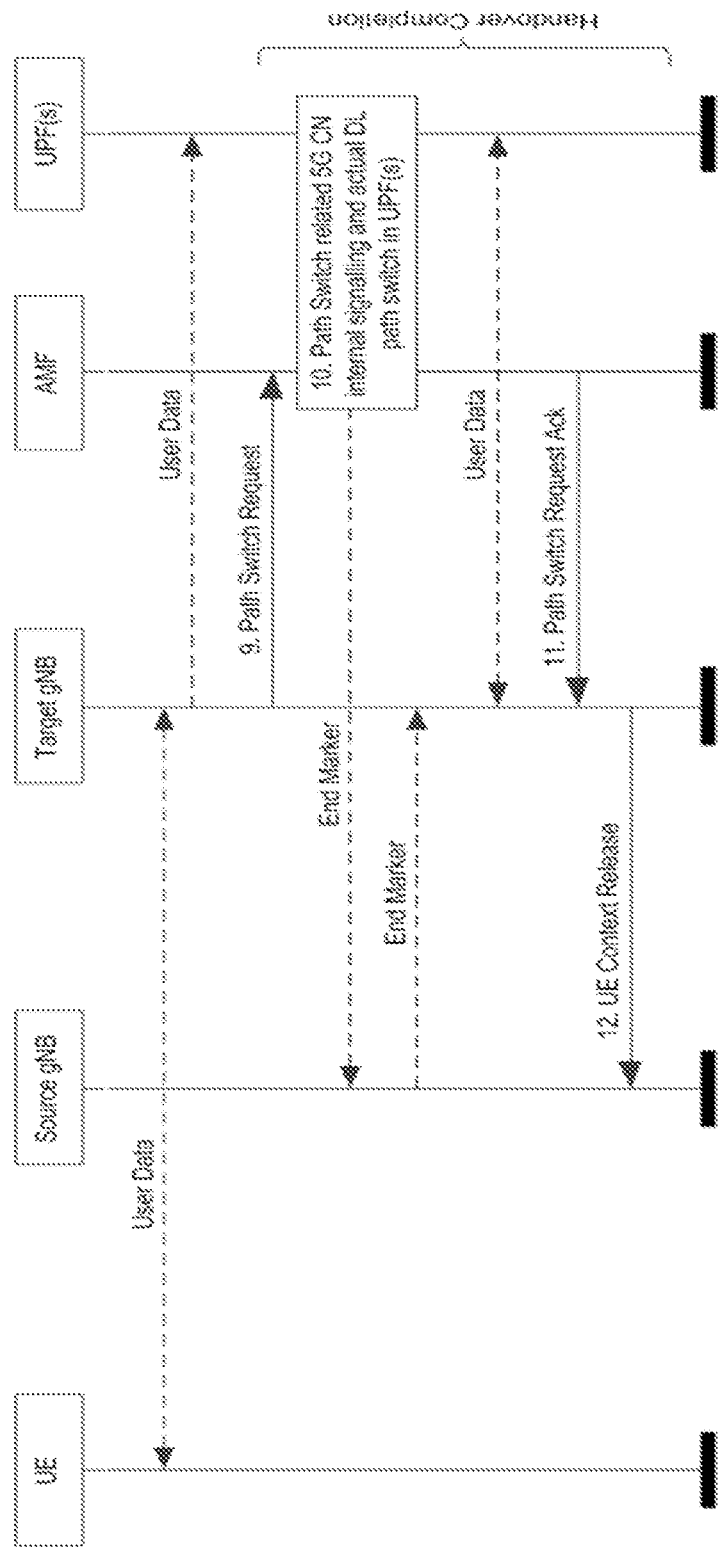

FIGS. 4A-C illustrate a conventional signaling procedure involving a UE, a source node, here denoted source gNB, and a target node, here denoted target gNB, during a handover procedure. An Access and Mobility management Function, AMF, node is also shown in these figures and also in some of the following figures, which is a well-known node that handles control plane traffic in a core network. In the terminology used throughout this description, the terms source node and target node are more or less interchangeable with the terms source cell and target cell, respectively. In more detail, FIG. 4A illustrates a handover preparation phase, FIG. 4B illustrates a handover execution phase following FIG. 4A, and FIG. 4C illustrates a handover completion phase following FIG. 4B.

Both in LTE and NR, some principles are used for handovers, which is commonly referred to as "mobility in RRC_CONNECTED", as follows:

Mobility in RRC_CONNECTED is Network-based as the network has access to information regarding the current situation in the network, such as load conditions in cells, resources in different nodes, available frequencies, etc. The network can also take into account the situation of many UEs in the network, for a resource allocation perspective.

The network prepares a target cell before the UE accesses that cell. The source node provides the UE with the RRC configuration to be used in the target cell, including SRB1 configuration to send HO complete.

The UE is provided by the target node with a target C-RNTI i.e. the target node identifies the UE from MSG.3 on MAC level for the HO complete message. Hence, there is no context fetching performed, unless a failure occurs.

To speed up the handover, the network provides to the UE needed information on how to access the target cell, e.g. Random Access Channel (RACH) configuration, so the UE does not have to acquire system information prior to the handover which otherwise would take some time to do.

The UE may be provided with Contention-Free Random Access, CFRA, resources, i.e. in that case the target node identifies the UE from a preamble MSG.1 transmitted by the UE. The principle behind this is that the procedure can always be optimized with dedicated resources. In Conditional Handover (CHO), that might be somewhat difficult as there is uncertainty about the final target cell but also about the timing of HO operations.

Security is prepared before the UE accesses the target cell, e.g. keys for encryption need to be updated or "refreshed" before the UE sending the RRC Connection Reconfiguration Complete message, based on new keys and encrypted and integrity protected so that the UE can be verified in the target cell.

Both full reconfiguration and delta reconfiguration are supported so that the size of the handover command can be minimized.

Work Items to achieve mobility robustness in release 16 (Rel-16) for LTE and NR and Conditional Handover will now be described.

Two new work items for mobility enhancements in LTE and NR have started in 3GPP in release 16. The main objectives of the work items are to improve the robustness at handover and to decrease the interruption time at handover.

One potential problem related to robustness at handover is that the handover command, herein referred to as HO Command, e.g. the above-mentioned RRCConnectionReconfiguration message with the mobilityControlInfo field and RRCReconfiguration message with the reconfigurationWithSync field is normally sent when the radio conditions for the UE are already quite bad, as also explained above. As a result, the HO Command may not reach the UE in time, particularly if the message is segmented or there are retransmissions resulting in added delays.

In LTE and NR, different solutions to increase mobility robustness have been discussed in the past. One solution discussed in NR is called "conditional handover" or "early handover command". In order to avoid the undesired dependence on the serving radio link and current radio conditions at the time when the UE should execute the handover, the possibility to provide RRC signaling for the handover to the UE earlier should be provided. To achieve this, it should be possible to associate the HO command with a condition e.g. based on radio conditions possibly similar to the ones associated to a so-called A3 event, where signals from a given neighbor becomes 'X' dB better than serving cell. The A3 event and other events that trigger measurement reports are defined by 3GPP, see for example 3GPP document TS 38.331 version 15.3.0, Release 15. As soon as the condition in the HO command is fulfilled, the UE executes the handover in accordance with the provided HO command.

Such a condition could e.g. be that the quality of the target cell or beam becomes 'Y' dB stronger than the serving cell. The threshold X used in a preceding measurement reporting event should then be chosen lower than the threshold in the handover execution condition. This allows the serving cell to prepare the handover upon reception of an early measurement report and to provide the RRCConnectionReconfiguration message with the mobilityControlInfo field (or the RRCReconfiguration message with the ReconfigurationWithSync field) at a time when the radio link between the source cell and the UE is still stable. The execution of the handover can then be done at a later point in time (at a different signal threshold) which is considered optimal for the handover execution.

Figure 5:
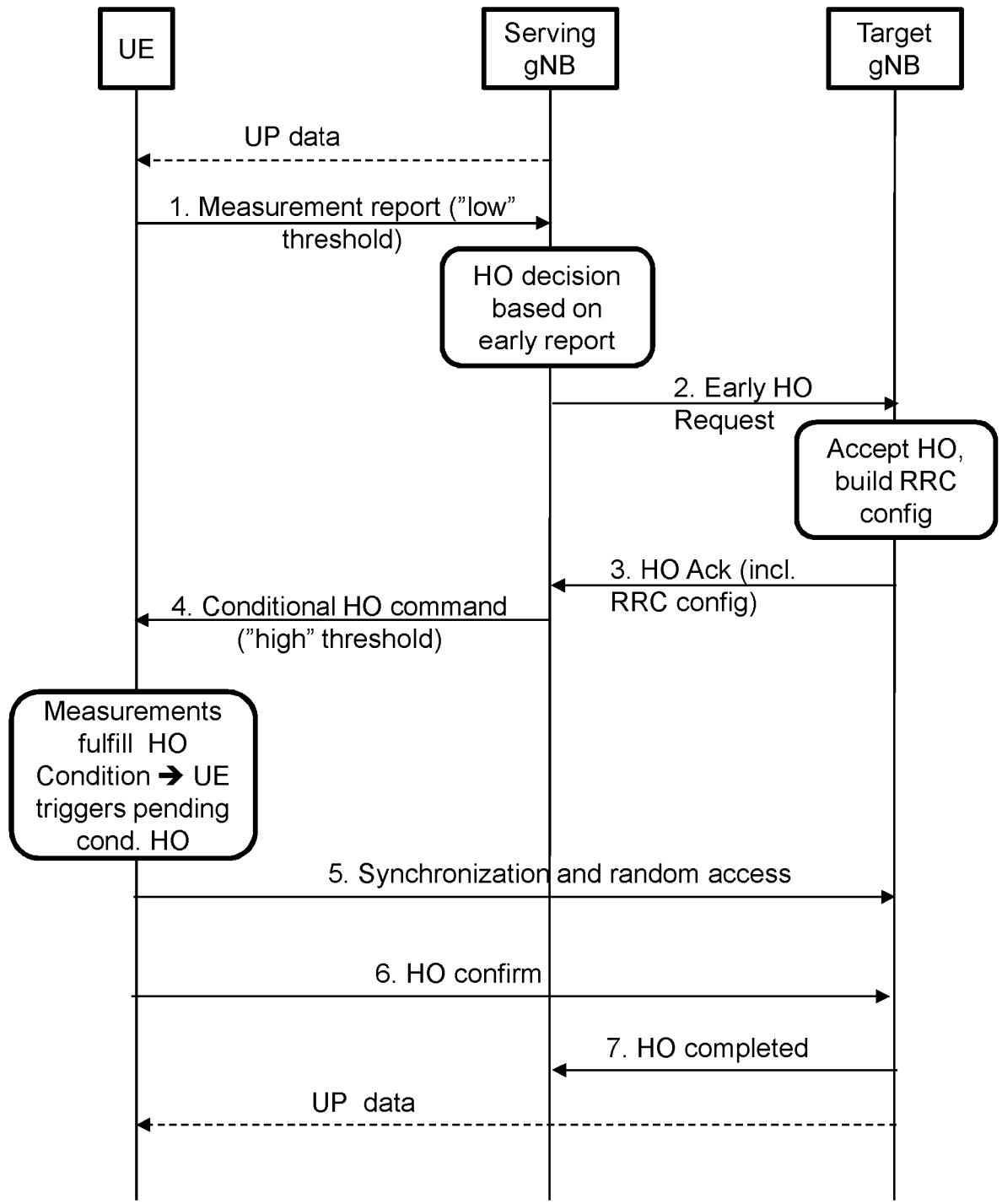
FIG. 5 is a signaling diagram illustrating a conventional handover from a serving gNB to a target gNB when conditional handover is employed.

FIG. 5 depicts an example of a signaling procedure where a UE reports signal measurements, e.g. so-called Radio Resource Management, RRM, measurements, to its serving network as a basis for handover decision, involving a serving cell served by a serving gNB and a single target cell served by a target gNB. In practice, there may often be several cells or beams that the UE reports as possible candidates for handover, based on its preceding RRM measurements. The network should then have the freedom to issue conditional handover commands for several of those candidates. The message RRCConnectionReconfiguration (or RRCReconfiguration, in NR) for each of those candidates may differ e.g. in terms of the HO execution condition with respect to Reference signals to measure and threshold to exceed, as well as in terms of a Random Access (RA) preamble to be sent when a certain condition is met.

While the UE evaluates the condition in the conditional HO command, it should continue operating per its current RRC configuration, i.e., without applying the conditional HO command. When the UE determines that the condition is fulfilled, it disconnects from the serving cell, applies the conditional HO command and connects to the target cell. These operations are equivalent to the current, instantaneous handover execution.

An RRC Re-establishment procedure upon Handover failure or Radio Link Failure will now be described.

In traditional handovers, that is until Rel-15 of NR or LTE, measurement reports are configured so that the network can detect when a cell in a particular frequency is better than the SpCell which is a primary cell of a master or secondary cell group. Then, upon the reception of a measurement report the network may trigger a handover.

Radio conditions on the connection with the source node may drop, i.e. get worse, while the UE is sending measurement reports and/or the source node in the network is trying to transmit a handover command (an RRCConnectionReconfiguration with MobilityControlInfo in LTE or an RRCReconfiguration containing a reconfigurationWithSync in NR).

Figure 6:
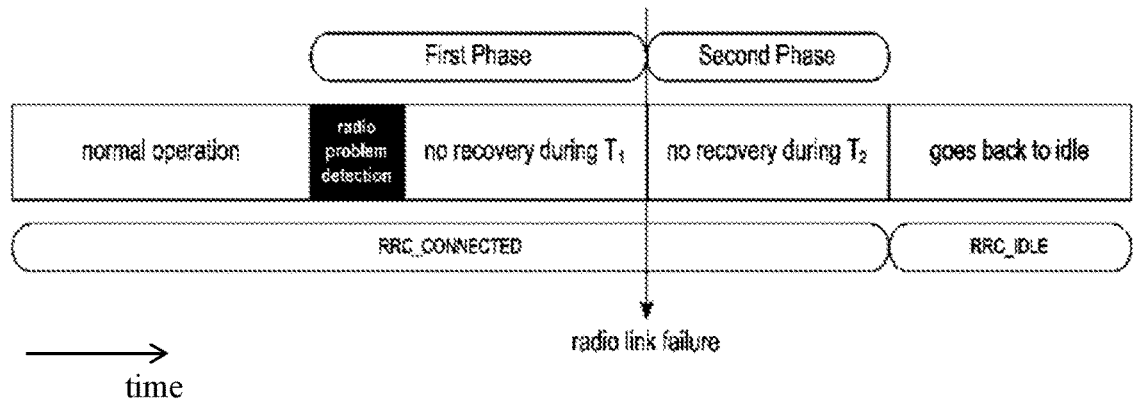
FIG. 6 is a schematic operation diagram illustrating a conventional way of handling Radio Link Failure, RLF, by means of first and second timers T1, T2 upon detecting a radio problem.

A conventional way of handling Radio Link Failure, RLF, will now be described. Upon detecting a radio problem, the UE starts a timer T1 which is denoted timer T310 in RRC. If there is no recovery while the timer is running, that timer expires, and the UE declares RLF and starts a second timer T2 which is denoted timer T311 in RRC, while it tries to perform cell selection and initiates re-establishment. This procedure is illustrated in the schematic time diagram depicted in FIG. 6. In NR RRC specifications of the 3GPP document TS 38.331, this is described in the extract below, relevant parts underlined, where FFS denotes For Further Study:

5.3.10.3 Detection of Radio Link Failure

The UE shall:

1> upon T310 expiry in PCell; or

1> upon random access problem indication from MCG MAC while neither T300, T301, T304 nor T311 is running; or 1> upon indication from MCG RLC that the maximum number of retransmissions has been reached:

2> consider radio link failure to be detected for the MCG i.e. RLF;

Editor's Note: FFS: How to handle RLC failure in CA duplication for MCG DRB and SRB.

2> if AS security has not been activated:

3> perform the actions upon going to RRC_IDLE as specified in 5.3.11, with release cause 'other';

2> else:

3> initiate the connection re-establishment procedure as specified in 5.3.7.

The UE shall:

1> upon T310 expiry in PSCell; or
1> upon random access problem indication from SCG MAC; or
1> upon indication from SCG RLC that the maximum number of retransmissions has been reached:
    2> consider radio link failure to be detected for the SCG i.e. SCG-RLF;
    Editor's Note: FFS: How to handle RLC failure in CA duplication for SCG DRB and SRB.
    2> initiate the SCG failure information procedure as specified in 5.7.3 to report SCG radio link failure.

A conventional way of handling handover failure will now be described. Upon the reception of a handover command, which comprises the RRCReconfiguration message with the reconfigurationWithSync field in NR or the RRCConnectionReconfiguration message with the mobilityControlInfo field in LTE, the UE starts a timer T304 with the value set to the field t304 in the message. Upon that, the UE applies the received message and tries to access the target cell. If the timer expires while the UE is trying to access the target cell, a handover failure is declared. The NR RRC specifications in 3GPP document TS 38.331 capture that as follows, relevant parts underlined:

5.3.5.5.2 Reconfiguration with Sync

The UE shall perform the following actions to execute a reconfiguration with sync.

1> stop timer T310 for the corresponding SpCell, if running;
1> start timer T304 for the corresponding SpCell with the timer value set to t304, as included in the reconfigurationWithSync;
1> if the frequencyInfoDL is included:
    2> consider the target SpCell to be one on the SSB frequency indicated by the frequencyInfoDL with a physical cell identity indicated by the physCellId;
1> else:
    2> consider the target SpCell to be one on the SSB frequency of the source SpCell with a physical cell identity indicated by the physCellId;
1> start synchronizing to the DL of the target SpCell and acquire the MIB of the target SpCell as specified in 5.2.2.3.1;
    NOTE: The UE should perform the reconfiguration with sync as soon as possible following the reception of the RRC message triggering the reconfiguration with sync, which could be before confirming successful reception (HARQ and ARQ) of this message.
1> reset the MAC entity of this cell group;
1> consider the SCell(s) of this cell group, if configured, to be in deactivated state;
1> apply the value of the newUE-Identity as the C-RNTI for this cell group;
1> configure lower layers in accordance with the received spCellConfigCommon;
1> configure lower layers in accordance with any additional fields, not covered in the previous, if included in the received reconfigurationWithSync.

5.3.5.8.3 T304 Expiry (Reconfiguration with Sync Failure)

The UE shall:

1> if T304 of the MCG expires:
    2> release dedicated preambles provided in rach-ConfigDedicated if configured;
    2> revert back to the UE configuration used in the source PCell;
    2> initiate the connection re-establishment procedure as specified in subclause 5.3.7.
        NOTE 1: In the context above, "the UE configuration" includes state variables and parameters of each radio bearer.
1> else if T304 of a secondary cell group expires:
    2> release dedicated preambles provided in rach-ConfigDedicated, if configured;
    2> initiate the SCG failure information procedure as specified in subclause 5.7.3 to report SCG reconfiguration with sync failure, upon which the RRC reconfiguration procedure ends;
1> else if T304 expires when RRCReconfiguration is received via other RAT (HO to NR failure):
    2> reset MAC;
    2> perform the actions defined for this failure case as defined in the specifications applicable for the other RAT.

Above, MIB denotes Master Information Block and SSB denotes Synchronization Signal Block.

A conventional way of performing a re-establishment procedure will now be described.

As described above, the re-establishment procedure is initiated upon the declaration of a HO failure or RLF. Other cases may also trigger the initiation of an RRC Re-establishment procedure, which may also be relevant in this context, such as an RRC connection reconfiguration failure of a CHO, or and integrity check failure, or mobility from NR, even though only intra-NR handovers and RLFs are highlighted. In the 3GPP document TS 38.331, these operations are described as follows, relevant parts underlined:

5.3.7.2 Initiation

The UE initiates the procedure when one of the following conditions is met:

1> upon detecting radio link failure of the MCG, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2; or
1> upon an RRC connection reconfiguration failure, in accordance with sub-clause 5.3.5.8.2.

The 3GPP document TS 38.300 summarizes the re-establishment procedure to a necessary level to understand the problem addressed herein and the solution described herein. As can be seen below, upon declaring RLF or handover failure, the UE transmits an RRCReestablishmentRequest with a AS context identifier–source Physical Cell Identity (PCI)+source C-RNTI. If the target node is prepared, e.g. if this was a failed handover, the target node may respond with an RRCReestablishment message possibly multiplexed with an RRCReconfiguration message. Then, the UE transmits an RRCReconfigurationComplete and an RRCReestablishmentComplete.

The re-establishment procedure is reproduced in the 3GPP document TS 38.300 as follows:

9.2.3.3 Re-Establishment Procedure

A UE in RRC_CONNECTED may initiate the re-establishment procedure to continue the RRC connection when a failure condition occurs (e.g. radio link failure, reconfiguration failure, integrity check failure . . . ).

Figure 7:
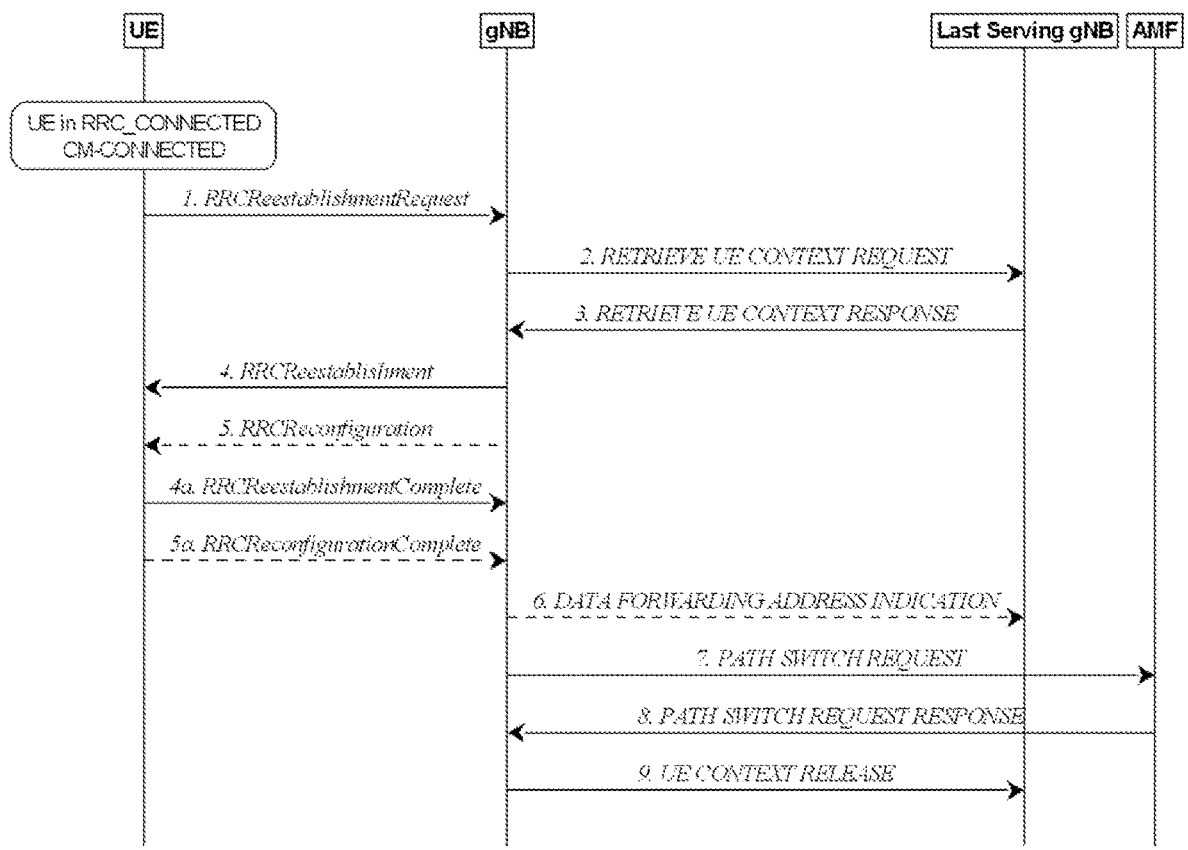
FIG. 7 is a signaling diagram illustrating a conventional re-establishment procedure started by a wireless device denoted UE, in accordance with the 3GPP document TS 38.300.

FIG. 7 shows a signaling diagram in TS 38.300 which describes the re-establishment procedure started by the UE and comprises the following operations:

1. The UE re-establishes the connection, providing the UE Identity (PCI+C-RNTI) to the gNB where the trigger for the re-establishment occurred.
2. If the UE Context is not locally available, the gNB, requests the last serving gNB to provide UE Context data.
3. The last serving gNB provides UE context data.
4/4a. The gNB continues the re-establishment of the RRC connection. The message is sent on SRB1.
5/5a. The gNB may perform the reconfiguration to re-establish SRB2 and DRBs when the re-establishment procedure is ongoing.
6. If loss of DL user data buffered in the last serving gNB shall be prevented, the gNB provides forwarding addresses.
7/8. The gNB performs path switch.
9. The gNB triggers the release of the UE resources at the last serving gNB.

One of the actions the UE performs upon re-establishment is reverting to the configuration that has been used in the source cell, which is especially relevant in the case the UE has received an RRCReconfiguration message with the reconfigurationWithSync field and fails, e.g. due to T304 expiry.

In RAN2 #104 in Spokane in November 2018, the following has been agreed concerning conditional handover for LTE:

| Agreements |
| --- |
| 1 RAN2 will consider a conditional handover: This is defined as UE having network configuration for initiating access to a target cell based on configured condition(s). |
| 2 Usage of conditional handover is decided by network. UE evaluates when the condition is valid. |
| => FFS on the exact details of the procedures |

| Agreements |
| --- |
| 1 Support configuration of one or more candidate cells for conditional handover. |
| => FFS how many candidate cells (UE and network impacts should be clarified). |

A significant aspect to be highlighted here is that the network may configure one or more candidate cells for conditional handover. One possible solution is that the UE receives an RRCConditionalReconfiguration like message that may contain an RRCReconfiguration with a reconfigurationWithSync prepared by each candidate. Hence, if the source decides to configure the UE with more than one candidate or target cell, the UE receives more than one RRCReconfiguration with reconfigurationWithSync message, one for each potential target candidate. It may be assumed for example that the UE has received a conditional handover associated to cells A, B and C, i.e. under the assumption that all these three cells are prepared for a UE handover execution.

When it comes to the triggering condition, there may be a single triggering condition for multiple cells or each target candidate cell may have its own triggering condition.

It should be noted that the previous terminology corresponds to the NR terminology in the afore-mentioned 3GPP document TS 38.331. In LTE, the equivalent solution would work with an RRCConnectionReconfiguration message with the mobilityControlInfo field.

It will now be described how the UE may operate upon T310 expiry while condition for CHO is running.

One thing that may happen after the UE has received CHO configuration is that radio link problems may be detected, i.e., when the number of out-of-sync (OOS) indications increases above a certain threshold N, and the UE starts timer T310. If the link is not recovered, it may happen that timer T310 expires while the UE is monitoring the triggering condition for CHO(s) for multiple cells.

The current RLF handling procedure is not specified for this particular case, hence, one should assume the baseline procedure as the existing solution. In that case, the UE would initiate an RRC re-establishment procedure, as described in the 3GPP document TS 38.331, sub-clause 5.3.7.

Some further examples of how a communication failure may be detected and declared by the UE will now be described. It will first be described how the UE may operate upon T304 expiry while the UE is executing a CHO.

If one of the monitored cells fulfill the condition for CHO, the UE shall trigger a CHO execution. Although that has not been fully described in the RRC specifications yet, one possible alternative is that upon the triggering of the condition the UE simply applies the stored RRCReconfiguration with reconfigurationWithSync message associated to the triggered cell and executes the handover. Upon that execution procedure, which involves trying to synchronize with the target cell, performing random access and transmitting a handover complete message (e.g. an RRCReconfiguration-Complete message) any of these steps may fail while timer T304 expires. In that case, the UE declares a conditional handover failure (which may be like an ordinary handover failure).

The current handover failure or conditional handover handling procedure is not specified for this particular case. Hence, the "baseline" procedure can be assumed as the existing solution. In that case, the UE would initiate an RRC re-establishment procedure, as described in the 3GPP document TS 38.331, sub-clause 5.3.5.8.3.

Some other cases of communication failure triggering re-establishment procedure will now be described.

In the present disclosure, other communication failure cases may also be relevant for employing the procedure in FIG. 2. For example, if the UE is configured to perform mobility from NR to another RAT, e.g. LTE. In that case, the UE connected to an NR PCell may receive an NR message with a configuration associated to a target cell in another RAT e.g. an RRCConnectionReconfiguration message with the mobilityControlInfo field in the LTE format. If that is used in conditional handover from NR to LTE, for example, the UE also receives a condition associated to that LTE message so that the UE only performs the handover to LTE if/when the condition is fulfilled for a particular LTE cell.

A first kind of communication failure that may occur is when upon the reception of the above NR or LTE message via NR, the UE is unable to comply with that message (either NR parts or LTE parts). A second possible failure is when the UE complies with the message and, after the condition is fulfilled the UE tries to apply the LTE message and fails, i.e., a protocol error occurs. A third possible failure is when the UE successfully applies the LTE procedure of RRCConnectionReconfiguration after the condition is fulfilled for the LTE cell and, upon the attempt to connect to that cell the T304 timer expires. Either of the above failures may correspond to the aforementioned failure to comply with a configuration for accessing the wireless network, which was mentioned as an example of the communication failure detected in action 202.

Below, an example is shown as captured in the NR RRC specifications for the first two cases, where upon these the UE performs re-establishment.

5.4.3.5 Mobility from NR Failure

The UE shall:
1> if the UE does not succeed in establishing the connection to the target radio access technology; or
1> if the UE is unable to comply with any part of the configuration included in the MobilityFromNRCommand message; or
1> if there is a protocol error in the inter RAT information included in the MobilityFromNRCommand message, causing the UE to fail the procedure according to the specifications applicable for the target RAT:
2> revert back to the configuration used in the source PCell;
2> initiate the connection re-establishment procedure as specified in subclause 5.3.7.

A current solution for RRC Re-establishment after a CHO failure or RLF while CHO was being monitored, will now be described.

As described above, an RRC re-establishment procedure would be initiated by the UE upon the detection of failure during CHO e.g. expiry of timer T310 and RLF declaration, or upon the expiry of timer T304 (handover failure declaration), etc. Then, the UE shall perform some actions and then perform cell selection, as described in the RRC specifications TS 38.331 for NR, which is similar to LTE, relevant parts underlined:

Upon initiation of the procedure, the UE shall:
1> stop timer T310, if running;
1> stop timer T304, if running;
1> start timer T311;
1> suspend all RBs, except SRB0;
1> reset MAC;
1> release the MCG SCell(s), if configured, in accordance with sub-clause 5.3.5.5.8;
1> release the current dedicated ServingCell configuration and apply the specified values in corresponding specification except for the parameters for which values are provided in SIB1;
1> release delayBudgetReportingConfig, if configured, and stop timer T3xx, if running;
1> apply the default MAC Cell Group configuration as specified in 9.2.x1;
1> perform cell selection in accordance with the cell selection process as specified in TS 38.304 [21].

Above, SIB denotes System Information Block. As described above and agreed in RAN2 #104, the UE may have RRC configurations for multiple target cells, e.g. provided by the source network node via CHO configuration, which were considered as handover candidates by the source node e.g. in a conditional handover configuration. Hence, there may be a high likelihood that after the failure detection the UE selects a cell from which the UE has already obtained and stored an RRCReconfiguration message with reconfigurationWithSync field or RRCConnectionReconfiguration message with mobilityControlInfo field, if that is an LTE cell. For the sake of exemplifying the problem, it can be assumed that upon the failure the UE has obtained and stored the following configurations associated to the following cells:

RRCReconfiguration with reconfigurationWithSync for cell A
RRCReconfiguration with reconfigurationWithSync for cell B
RRCReconfiguration with reconfigurationWithSync for cell C These are the configurations that target candidate cells A, B or C have chosen for that UE if one of these cells would be the target for CHO. However, upon a failure like RLF or CHO failure, and upon selecting one of these cells A, B or C during cell selection while timer T311 is running, the UE would in a conventional procedure perform the whole RRC re-establishment procedure (which consumes signaling and adds a delay or latency—1.5 Round Trip Times, RTT, in the air interface) to finally receive an RRCReconfiguration from the target cell (which may be the configuration for cell A, B or C) which regardless if delta or full configuration is applied, would be quite similar to the RRCReconfiguration for cell A, B or C which the UE has already available, as these were received in the CHO configuration.

To summarize the above problem discussion, if the UE in a conventional procedure performs re-establishment after selecting a cell (e.g. one of A, B, C) from which it has stored an RRCReconfiguration with reconfigurationWithSync e.g. thanks to a conditional handover configuration, the UE first initiates a re-establishment procedure to then be reconfigured again with a similar configuration which it already has available, and, not until after 1.5 RTT. This is clearly a waste of time, signaling and resources which can be avoided by using the procedure of FIG. 2 which could be implemented e.g. as follows.

When implementing the procedure in FIG. 2, a UE may have been configured by a source node with a conditional handover configuration for at least one target candidate cell-X of a target node. The UE may then perform the following, as a non-limiting example:

1/ Start a timer, e.g. a timer similar to T311, and perform cell selection upon the detection of a failure, corresponding to the above-described communication failure, while having stored a conditional handover configuration for target cell-X.

2/ If upon cell selection after detection of failure, the UE selects a cell that is a target cell-X that the UE has a conditional handover configuration stored, the UE applies the conditional handover configuration for cell-X and executes the handover (or conditional handover) to cell-X.

3/ Else if upon cell selection after detection of failure, the UE selects a cell that is not a target cell-X for which the UE has a conditional handover configuration, the UE initiates an RRC re-establishment procedure.

Some advantages that can be achieved when using the procedure in FIG. 2 may be as follows:

Unnecessary delay to start transmitting data and signaling in a target cell after a handover failure or radio link failure, can be avoided when the UE has a conditional handover configuration already stored for the selected cell.

By applying the stored CHO configuration, i.e. the RRCReconfiguration message with the reconfigurationWithSync field if an NR cell or an RRCConnectionReconfiguration message with the mobilityControlInfo field if an LTE cell, for a target cell-X after cell selection instead of initiating the re-establishment procedure, much less signaling is transmitted over the air. Also, the delay to recover from a failure is much shorter than in conventional procedures.

The following messages used in the RRC re-establishment procedure, sent after the failure detection such as handover failure, conditional handover failure, or RLF while CHO condition is running, and cell selection, can be omitted thanks to the fact that the UE opportunistically uses the stored configurations The numbering of these messages below refer to the signaling diagram of FIG. 8B where the target gNB is denoted candidate gNB B.
- 11. UE→target gNB: RRCReestablishmentRequest
- 13: target gNB→UE: RRCReestablishment
- 14: target gNB→UE: RRCReconfiguration
- 15: UE→target gNB: RRCReestablishmentComplete Thus, there would otherwise be at least an additional 1.5 round trip time over the air interface, more and larger messages are needed, which imply longer processing delays, and at the end, the UE would receive similar configuration that it has anyway stored, which is also an inefficient way to utilize the radio resources. All this can be avoided by using the solution described herein. However, since SpCell and SCell configurations are released during re-establishment, these configurations need to be provided to the UE in the first RRCReconfiguration message after re-establishment, in case the SpCell and SCell are relevant as target cells.

Some further aspects and details of this description will now be discussed. First, some of the terminology used herein will be explained.

The terms handover and reconfiguration with sync have been used herein with a similar meaning. Hence, a conditional handover may also be called a conditional reconfiguration with sync. In NR terminology, the handovers are typically called an RRCReconfiguration with a reconfigurationWithSync (field containing configuration necessary to execute a handover). In LTE terminology, the handovers are typically called an RRCConnectionReconfiguration with a mobilityControlInfo (field containing configuration necessary to execute a handover).

Most of the UE and network actions are described herein as being performed in NR or LTE. In other words, the configuration of a conditional HO received in NR for NR cells, CHO executed in NR, failure detection in NR, and upon failure detection cell selection in NR frequencies and re-establishing in NR. However, the procedures and features described herein, such as the procedure of FIG. 2, are also applicable when any of the described steps and operations occurs in different RATs, as described in the following examples:

- The UE is configured with a conditional HO in NR (for candidate NR and LTE cells), then the condition is triggered for an NR cell and UE executes the HO in NR; Upon the detection of a failure, the UE may select an LTE cell and apply the method: initiate handover execution in the selected LTE cell is the UE has a stored CHO configuration for the selected inter-RAT cell or initiate connection re-establishment in LTE or NR if the UE does not have stored CHO configuration for the selected inter-RAT cell.
- The UE is configured with a conditional HO in LTE (for candidate NR and LTE cells), then the condition is triggered for an LTE cell and UE executes the HO in LTE; Upon the detection of a failure, the UE may select an NR cell and apply the method: initiate handover execution in the selected NR cell is the UE has a stored CHO configuration for the selected inter-RAT cell or initiate connection re-establishment in NR or LTE if the UE does not have stored CHO configuration for the selected inter-RAT cell.
- The UE is configured with a conditional HO in NR (for candidate NR and LTE cells), then the condition is triggered for an LTE cell and UE executes the HO in LTE; Upon the detection of a failure, the UE may select an LTE cell and apply the method: initiate handover execution in the selected LTE cell is the UE has a stored CHO configuration for the selected inter-RAT cell or initiate connection re-establishment in LTE or NR if the UE does not have stored CHO configuration for the selected inter-RAT cell.
- The UE is configured with a conditional HO in LTE (for candidate NR and LTE cells), then the condition is triggered for an NR cell and UE executes the HO in NR; Upon the detection of a failure, the UE may select an NR cell and apply the method: initiate handover execution in the selected NR cell is the UE has a stored CHO configuration for the selected inter-RAT cell or initiate connection re-establishment in NR or LTE if the UE does not have stored CHO configuration for the selected inter-RAT cell.
- Or, in more general terms, the UE is configured with a condition HO in RAT-1 for cells in RAT-1 or RAT-2, then the condition is triggered and UE executes the HO in RAT-2; Upon failure detection the UE may either select a cell in RAT-1 or RAT-2; Upon the detection of a failure, the UE may select a cell in RAT-1 or RAT-2 cell and apply the method: initiate handover execution in the selected cell of RAT-1 or RAT-2 if the UE has a stored CHO configuration for the selected inter-RAT cell or initiate connection re-establishment in RAT-1 or RAT-2 if the UE does not have stored CHO configuration for the selected inter-RAT cell.

The procedure is mostly described herein in the context of conditional handover, which should however not be seen as a limiting factor. For example, the procedure may also be applicable for handovers triggered by the reception of the RRCReconfiguration message with the reconfigurationWithSync field without any condition associated, or the RRCConnectionReconfiguration message with the mobilityControlInfo field. Then, upon the reception of the message and the failure to execute the handover, the UE may have stored configurations of multiple cells provided to the UE as a backup in case the intended handover has failed. In that case, the UE may act depending on the cell it has selected. As described above, in case the UE selects a cell from which it has available an RRCReconfiguration prepared by the target node, the UE can send a handover complete message and complete a handover which may be seen as a backup handover, in accordance with action 208. In case the UE does not have an RRCReconfiguration with a reconfigurationWithSync or equivalent for the selected cell, the UE continues to perform a re-establishment procedure, in accordance with action 210 of FIG. 2.

Some further examples of how the solution and its procedure operations could be used and realized, will now be described with reference to two examples 1 and 2.

Example 1: Start a timer (e.g. a T311 like timer) and perform cell selection upon the detection of a communication failure while having stored a conditional handover configuration for target cell-X. Some alternatives A-C of how a communication failure may be declared have been mentioned above and will now be outlined in more detail.

A) The detection of a communication failure may be the detection of a conditional handover failure.
- In one alternative, the failure may be declared upon the expiry of a conditional handover failure timer, e.g. a T304 like timer, possibly started when the condition associated to a conditional handover is fulfilled.
- In another alternative, the failure may be declared upon a random access channel (RACH)/procedure failure (e.g. identified via an indication from lower layers, like the MAC layer), which may be declared upon reaching a maximum number of preamble transmissions, or upon reaching an uplink power maximum, upon a number of power ramping procedures.

In another alternative, the failure may be declared upon a lack of compliance of the RRCReconfiguration or RRC ConnectionReconfiguration message prepared by the target node of candidate target cell-X that has triggered the CHO condition.

In another alternative, the failure may be declared upon a lack of compliance of the RRCReconfiguration or RRC ConnectionReconfiguration message prepared by the source node.

B) The detection of a communication failure may be the detection of a handover failure.

In one alternative, the failure may be declared upon the expiry of a handover failure timer (e.g. T304 like timer, possibly started when the RRCReconfiguration or RRCConnectionReconfiguration is received by the UE);

In another alternative, the failure may be declared upon a random access channel (RACH)/procedure failure, which may be declared upon reaching a maximum number of preamble transmissions, or upon reaching an UL power maximum, upon a number of power ramping procedures.

In another alternative, the failure may be declared upon a lack of compliance of the RRCReconfiguration or RRC ConnectionReconfiguration message for the target cell-X.

In another alternative, the failure may be declared upon a lack of compliance of the RRCReconfiguration or RRC ConnectionReconfiguration message prepared by the source node.

C) The detection of a communication failure may be the detection of a radio link failure.

In one alternative, the failure may be declared upon the expiry of a T310 like timer that is started upon the detection of radio link problems;

In another alternative, the failure may be declared upon the indication from lower layers of a random access failure;

In another alternative, the failure may be declared upon the indication from lower layers of a RLC failure e.g. due to a maximum number of retransmissions being reached.

Example 2: If upon cell selection after a failure is detected, the UE selects a cell that is a target cell-X for which the UE has a conditional handover configuration stored, the UE applies the conditional handover configuration for cell-X and executes the handover (or conditional handover) to cell-X.

In a procedure regarding conditional handover, the UE may receive multiple configurations applicable to different candidate target cells, and based on measurements the UE would trigger the conditional handover to such a cell.

Figure 8A:
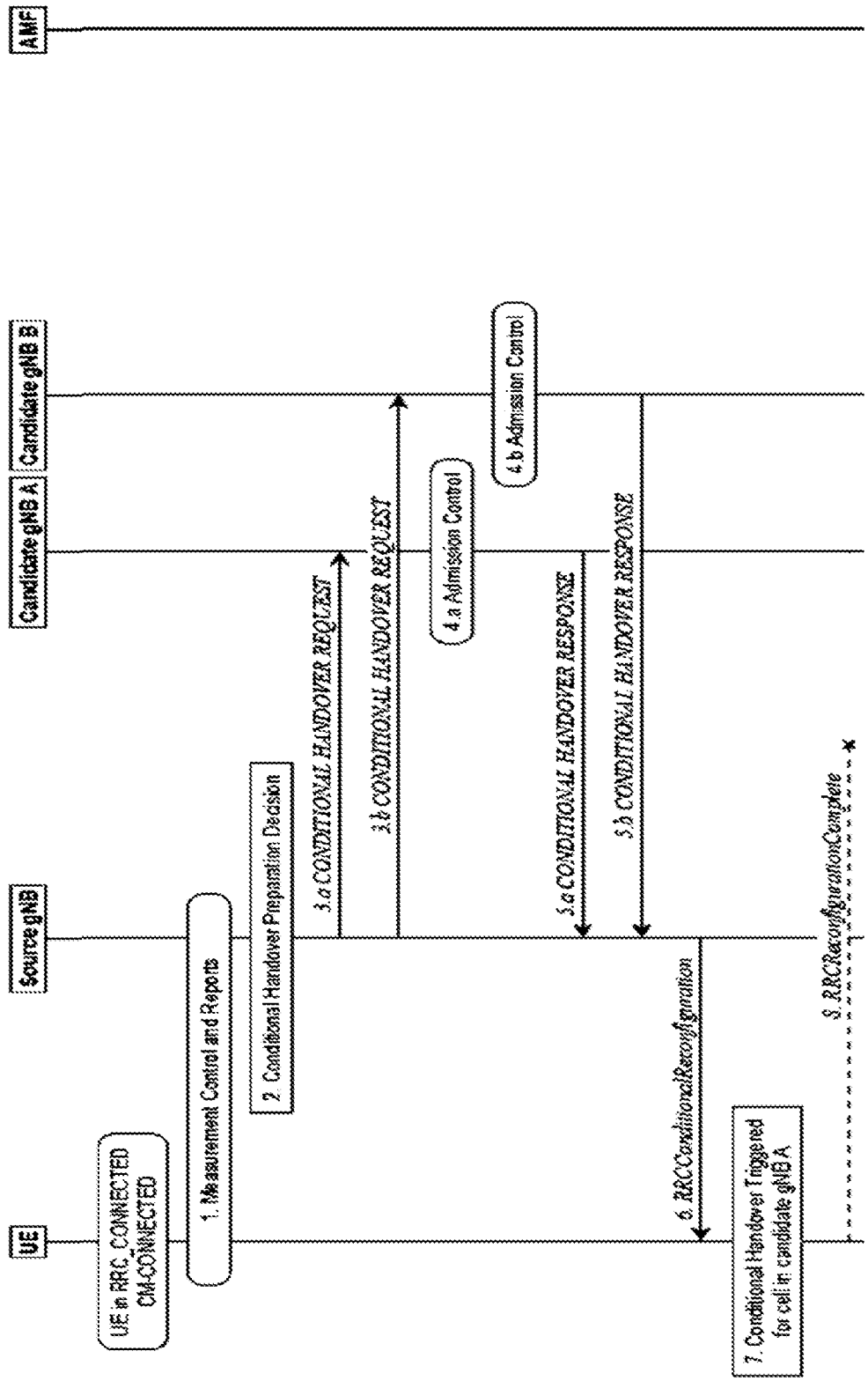
FIGS. 8A-B is a signaling diagram illustrating a conventional handover procedure when a wireless device or UE fails to transmit an RRCReconfigurationComplete message to a candidate gNB.

If the handover fails, e.g. due to timer (e.g. a T311 like timer) expires, random access failure, expiry of handover or conditional handover failure timer, or other failure, the UE would perform cell selection and initiate a re-establishment procedure. An example signaling diagram of how the cell selection and re-establishment procedure may be implemented is shown by consecutive procedural steps in FIGS. 8A-B where the procedural steps 1-8 in FIG. 8A are followed by the procedural steps 9-20 in FIG. 8B. In these figures, a source gNB is serving the UE's source cell and two target cells A and B are served by candidate gNBs A and B, respectively.

Figure 8B:
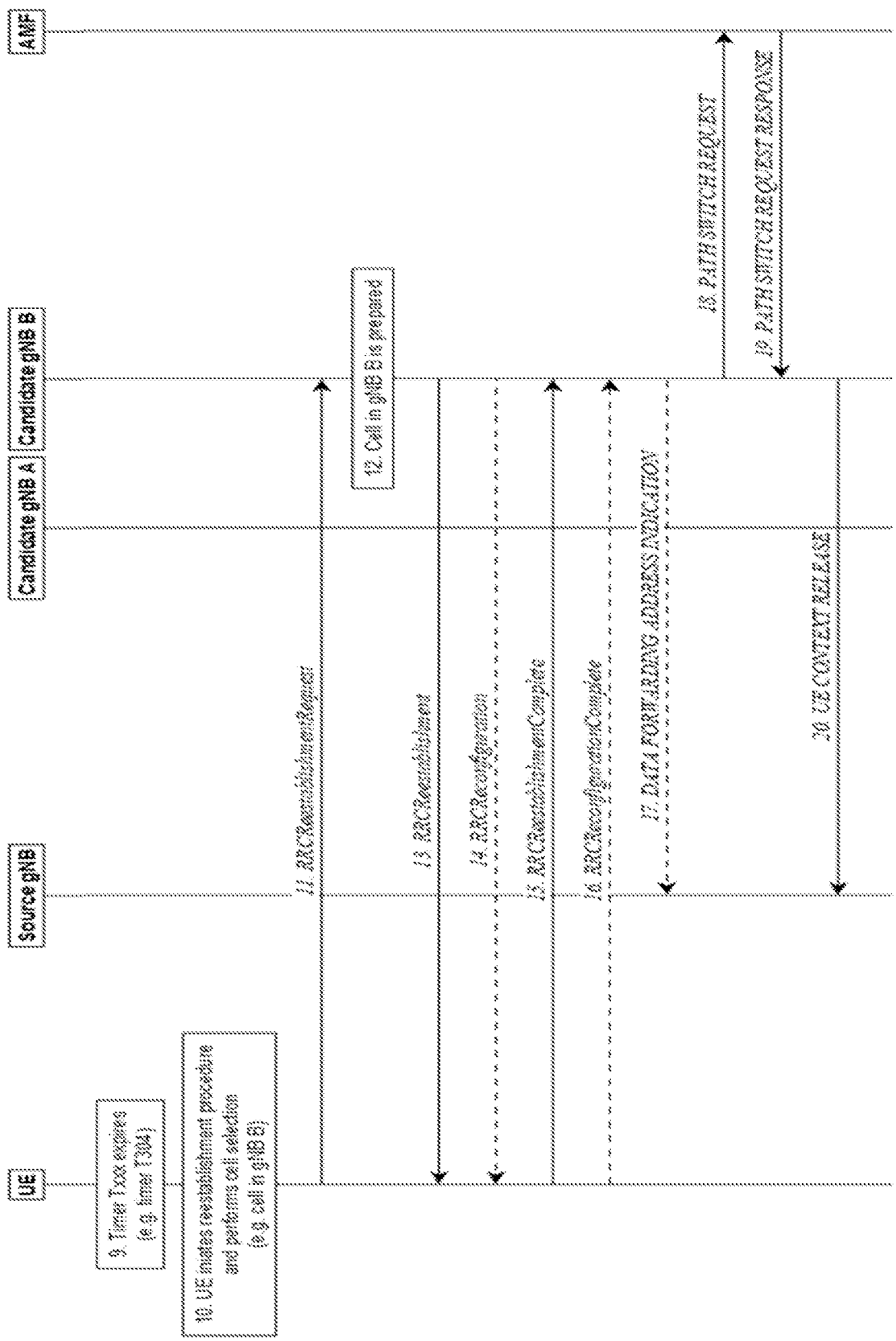

In step 8 or 9 of FIGS. 8A and 8B, respectively, the UE fails to transmit the RRCReconfigurationComplete message to the target cell in gNB A which triggered the conditional handover. In step 9 of FIG. 8B, it is shown that the timer Txxx (e.g. timer T304) expires thus triggering a communication failure and conditional handover, but the failure could also be a random access failure indicated by the lower layers, or any other failure. After detecting the failure, the UE performs cell selection, in this example selecting the target cell served by gNB B. Since the triggering conditions for each cell in the conditional handover may be different, cell A may have a lower threshold than cell B, meaning that the conditional handover to cell A could be triggered even if cell B has slightly better radio condition. When the UE performs cell selection, the UE may select a different candidate/target cell than the one triggering the conditional handover (in the figure a cell served by gNB B).

Once the UE has selected a cell after the failure, even if that cell is the same as the one which failed the conditional handover i.e. the cell in gNB A, the UE transmits the RRCReestablishmentRequest message to that cell. If gNB B is already prepared with the UE context from the conditional handover, the procedures continue as normal RRC reestablishment procedures, where the network transmits the RRCReestablishment and RRCReconfiguration message to the UE. In NR it is possible to multiplex the RRCReestablishment and RRCReconfiguration message so that the UE receives both messages before it transmits the RRCReestablishmentComplete (and then the RRCReconfigurationComplete) message to the network.

In this solution, the UE behavior following the failure detection during CHO, CHO failure or handover failure, is modified. Since the UE has already been configured with configurations applicable to multiple cells in the conditional handover, when the UE experiences the failure and selects a cell for which it has an RRC configuration stored e.g. thanks to the configuration is has received for a conditional handover, the UE applies these configurations.

Figure 9A:
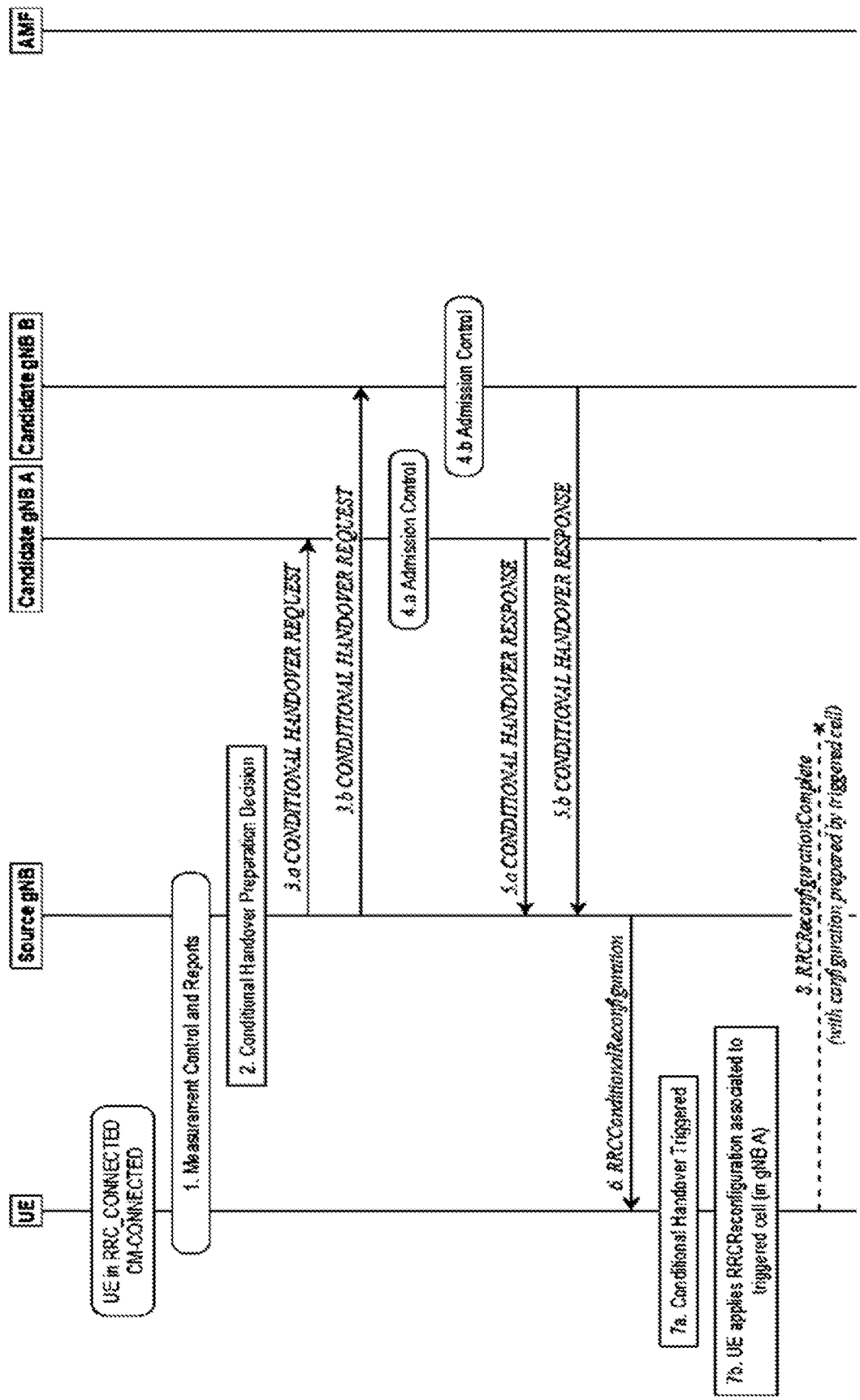
FIGS. 9A-B is a signaling diagram illustrating how the handover procedure of FIGS. 8A-B can be modified with substantially reduced signaling by employing the procedure of FIG. 2.
Figure 9B:
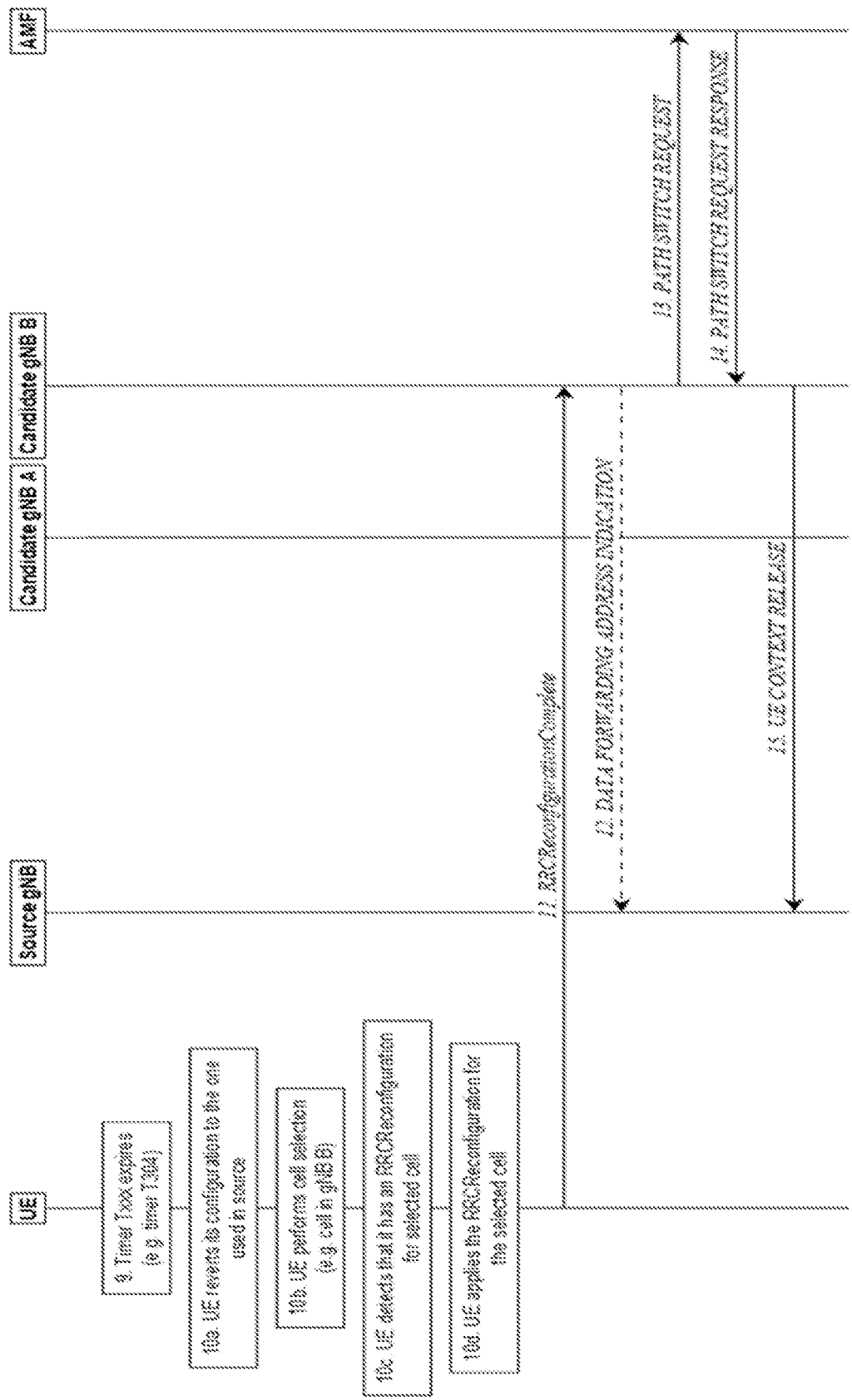

An example signaling diagram is shown in FIGS. 9A-B where the procedural steps 1-8 in FIG. 9A are followed by the procedural steps 9-15 in FIG. 9B. In this procedure, a UE experiencing failure during a conditional handover, applies the provided conditional handover configurations after the cell reselection made upon detecting a failure. FIGS. 9A-B thus illustrate an example of Re-establishment upon Conditional HO failure comprising the following steps 1-15.

1-7: Conditional Handover steps.

8-9: Conditional Handover fails, e.g. due to random access failure or timer expiration. This action corresponds to the above-described action 202.

10a: The UE reverts to the configurations used in the source cell.

10b: The UE performs cell selection. This action corresponds to the above-described action 204.

10c: The UE detects that it has a stored RRCReconfiguration for the cell it has selected e.g. obtained via a conditional handover configuration.

10d: The UE applies configurations received in the conditional handover applicable to the target cell. This action corresponds to the above-described action 208.

11: If selected cell in step 10b belong to the cells in the conditional handover configurations, transmit RRCReconfigurationComplete message.

12-15: Same steps as in Conditional Handover according to conventional procedures.

Upon cell selection after the failure detection, there are a few scenarios which could happen. Below are listed examples 1-3 of these scenarios, and examples of the UE behavior when basically employing the procedure of FIG. 2.
1) The UE does not have an RRCReconfiguration for the cell the UE selects e.g. that selected cell was not included in the conditional handover configuration or the UE did not have a conditional handover configuration:
   a. The UE discards the conditional handover configurations and initiates re-establishment procedures. This behavior corresponds to action 210 in FIG. 2.
2) The cell that the UE selects in the cell selection is included in the conditional handover and the radio quality is better than the conditional handover threshold for that cell:
   a. The UE transmits the RRCReconfigurationComplete message to the new cell (as it would in normal conditional handover without any failure).
3) The cell the UE selects to is included in the conditional handover, but the radio quality is worse than the conditional handover threshold for that cell:
   a. The UE discards the conditional handover configurations and transmits the RRCReestablishmentRequest message to that cell;
   b. The UE transmits the RRCReconfigurationComplete message to the target cell, even if the conditional handover threshold is not reached.
   c. If there is another cell configured in the conditional handover which fulfills its conditional handover threshold, the UE selects that cell (even if the radio quality of that one is worse than the originally selected cell) and transmits the RRCReconfigurationComplete message. If there are multiple other cells which fulfills the threshold:
      i. The UE re-selects to one of these cells exceeding the conditional handover threshold which has the best radio condition,
      ii. The UE re-selects to the cell which exceeds its threshold with the largest margin (in either absolute or relative terms).
   d. If there are no cells configured in the conditional handover which fulfills its conditional handover threshold, the UE:
      i. Transmits the RRCReestablishmentRequest message to the selected cell
      ii. Transmits the RRCReconfigurationComplete message to the selected cell.

Figure 10:
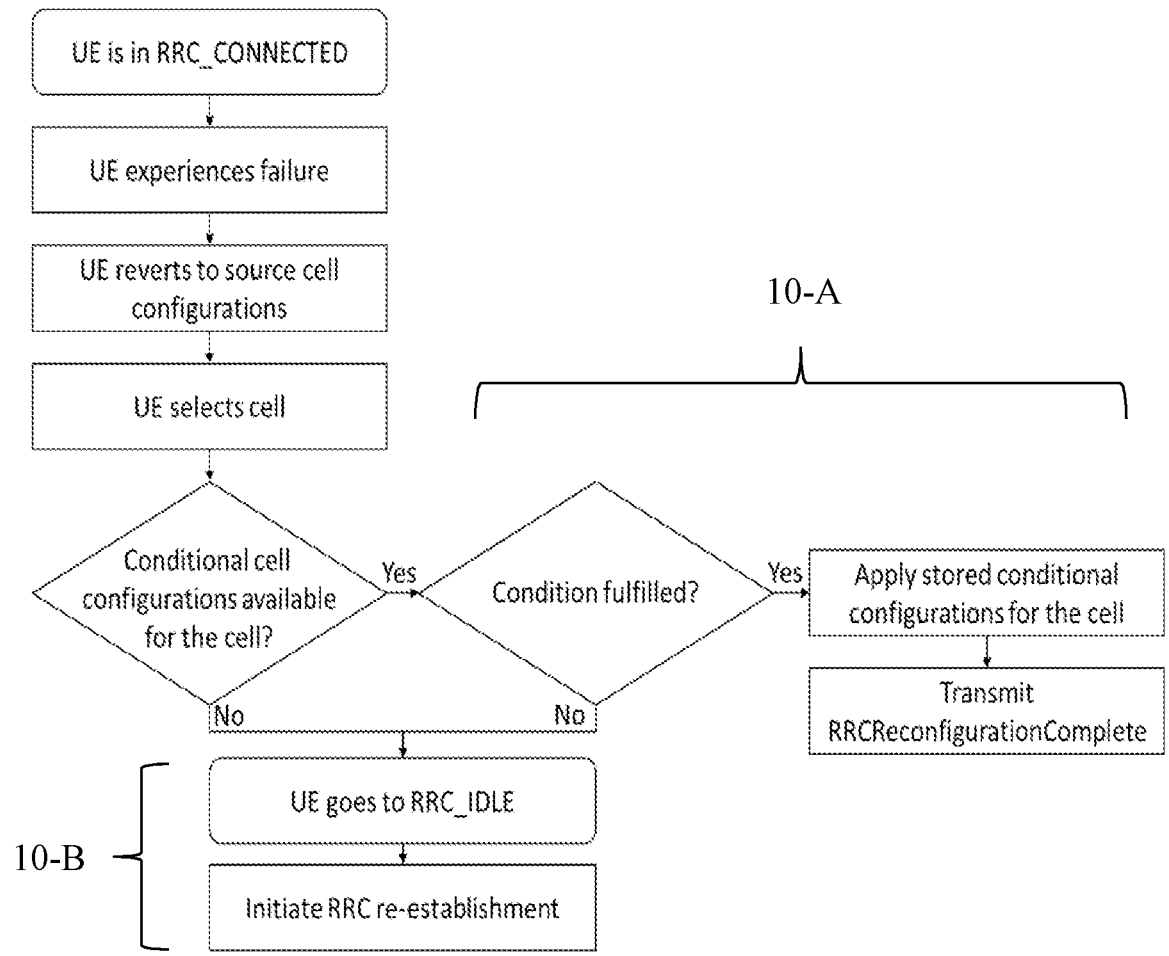
FIG. 10 is a flow chart illustrating a procedure in a wireless device, according to further example embodiments.

FIG. 10 is a flow chart illustrating another example of UE behavior for how to apply conditional configurations at communication failure. In this figure, the procedure indicated by 10-A corresponds to action 208 in FIG. 2, while the procedure indicated by 10-B corresponds to action 210 in FIG. 2.

Another possibility is to opportunistically use the stored RRCReconfiguration associated to the selected cell. In other words, upon failure detection the UE may perform cell selection as specified in the 3GPP document TS 38.304 including idle/inactive specifications, without any specific rule and, only after performing cell selection and detecting that it has stored an RRCReconfiguration associated to that cell, the UE then applies the associated RRCReconfiguration.

Another aspect of the examples and embodiments herein relates to the usage of dedicated RACH resources, that may be present in the RRCReconfiguration associated to the selected target cell.

In a first possible alternative, the dedicated RACH resources associated to the selected target cell after the failure detection, and present in the RRCReconfiguration (e.g. as part of the reconfigurationWithSync), may be considered as valid by the UE. In other words, upon selecting the cell and identifying that the UE has an RRCReconfiguration stored for that cell, the UE applies the RRCReconfiguration and is allowed to use the dedicated RACH configuration. In other words, the UE assumes the resources as valid and target candidates assume the resources are valid for that procedure.

In another possible alternative, the dedicated RACH resources associated to the selected target cell after the failure detection, and present in the RRCReconfiguration (e.g. as part of the reconfigurationWithSync), may be considered as invalid by the UE. In other words, upon selecting the cell and identifying that the UE has an RRCReconfiguration stored for that cell, the UE applies the RRCReconfiguration except the dedicated RACH configuration if it was available, and is NOT allowed to use the dedicated RACH configuration. In other words, the UE assumes the resources as NOT valid and target candidates assume the resources are NOT valid for that procedure. Hence, upon detecting the conditional handover failure and handover failure and then detecting that the UE can opportunistically use the stored RRCReconfiguration message, the UE can delete the dedicated RACH configuration and apply remaining parts of the stored message.

In another possible alternative, the UE is provided with a set of conditional RRCReconfiguration configurations and conditions, only to be used in case of failure (e.g. handover failure, radio link failure, reconfiguration failure, conditional handover failures). These configurations may also include configurations for the source cell. The configurations and conditions may be the same or different than the conditional handover configurations and conditions, and it is possible to only configure the conditional recovery configurations.

The benefit of including alternative configurations also for the source cell is in case specific configurations were employed, e.g. bandwidth parts, transmission time interval (TTI), TDD-slot configurations, Multiple Input, Multiple Output (MIMO) configurations or other UE specific physical uplink or downlink channel configurations, which are optimized for high performance but with less reliability, e.g. a narrow beam with high Signal to Interference and Noise Ratio (SINR). If the UE experiences a communication failure, e.g. a radio link failure, it selects a new cell. If the new cell is the same as the source cell and fulfills the condition for the recovery configurations, the UE would apply these and perform an intra-cell conditional handover instead of performing a re-establishment procedure.

This fallback configuration in the source cell could also be applicable prior to a communication failure, e.g. by configuring any of the following:
   A2 type event (source becomes worse than an absolute threshold);
   A5 type event (source becomes worse than one absolute threshold1 AND source becomes better than another absolute threshold2)

For the A2 type event, the recovery configuration would be applied as soon as the source cell becomes worse than a specified threshold, whereas for the A5 type event the recovery reconfigurations would only be applied if the source cell is between threshold2 and threshold1 (threshold2<source cell<threshold1).

In one possible way to implement the procedure of FIG. 2 in the RRC specification, the handover after the failure is detected can be executed as part of the re-establishment procedure, as follows, relevant parts underlined:

5.3.5.8.3 T304 Expiry (Reconfiguration with Sync Failure)

The UE shall:

1> if T304 of the MCG expires:
   2> release dedicated preambles provided in rach-ConfigDedicated if configured;
   2> revert back to the UE configuration used in the source PCell;
   2> initiate the connection re-establishment procedure as specified in subclause 5.3.7.
      NOTE 1: In the context above, "the UE configuration" includes state variables and parameters of each radio bearer.
      NOTE 2: In the context above, the UE keeps stored conditional handover configurations for candidate target cells upon reverting back to the configuration in the source PCell except the dedicated RACH configurations.
1> else if T304 of a secondary cell group expires:
   2> release dedicated preambles provided in rach-ConfigDedicated, if configured;
   2> initiate the SCG failure information procedure as specified in subclause 5.7.3 to report SCG reconfiguration with sync failure, upon which the RRC reconfiguration procedure ends;
1> else if T304 expires when RRCReconfiguration is received via other RAT (HO to NR failure):
   2> reset MAC;
   2> perform the actions defined for this failure case as defined in the specifications applicable for the other RAT.
. . .

5.3.7.3 Actions Following Cell Selection while T311 is Running

Upon selecting a suitable NR cell, the UE shall:

1> stop timer T311;
1> start timer T301;
1> if the UE has stored an RRCReconfiguration containing a reconfigurationWithSync for the selected cell;
   2> apply the stored RRCReconfiguration associated to the selected cell as specified in 5.3.5.3;
1> else:
   2> apply the timeAlignmentTimerCommon included in SIB1;
   2> initiate transmission of the RRCReestablishmentRequest message in accordance with 5.3.7.4;
      NOTE: This procedure applies also if the UE returns to the source PCell.

Upon selecting an inter-RAT cell, the UE shall:

1> if the selected inter-RAT cell is an E-UTRA cell; and
1> if the UE has stored an RRCConnectionReconfiguration containing a MobilityControlInfo for the selected cell:
   2> apply the stored RRCConnectionReconfiguration associated to the selected cell as specified in TS 36.331 [10];
1> else:
   2> perform the actions upon going to RRC_IDLE as specified in 5.3.11, with release cause 'RRC connection failure'.

By implementing one or more of the above-described examples and embodiments, the following advantages may be achieved:

The UE can be provided with recovery configurations to be applied upon a communication failure, e.g. related to radio link, handover, conditional handover, reconfiguration.

When the UE experiences a communication failure and selects a cell for which the UE has stored conditional configurations, the UE applies these configurations and continues the procedure as if the UE would perform a conditional handover.

The recovery configurations can also be associated with one or multiple conditions, which must be fulfilled in order to apply the configurations.

These recovery configurations can be the same as the conditional handover configurations, or they can be a separate set of configurations.

Some further extensions and variations will now be described.

Figure 11:
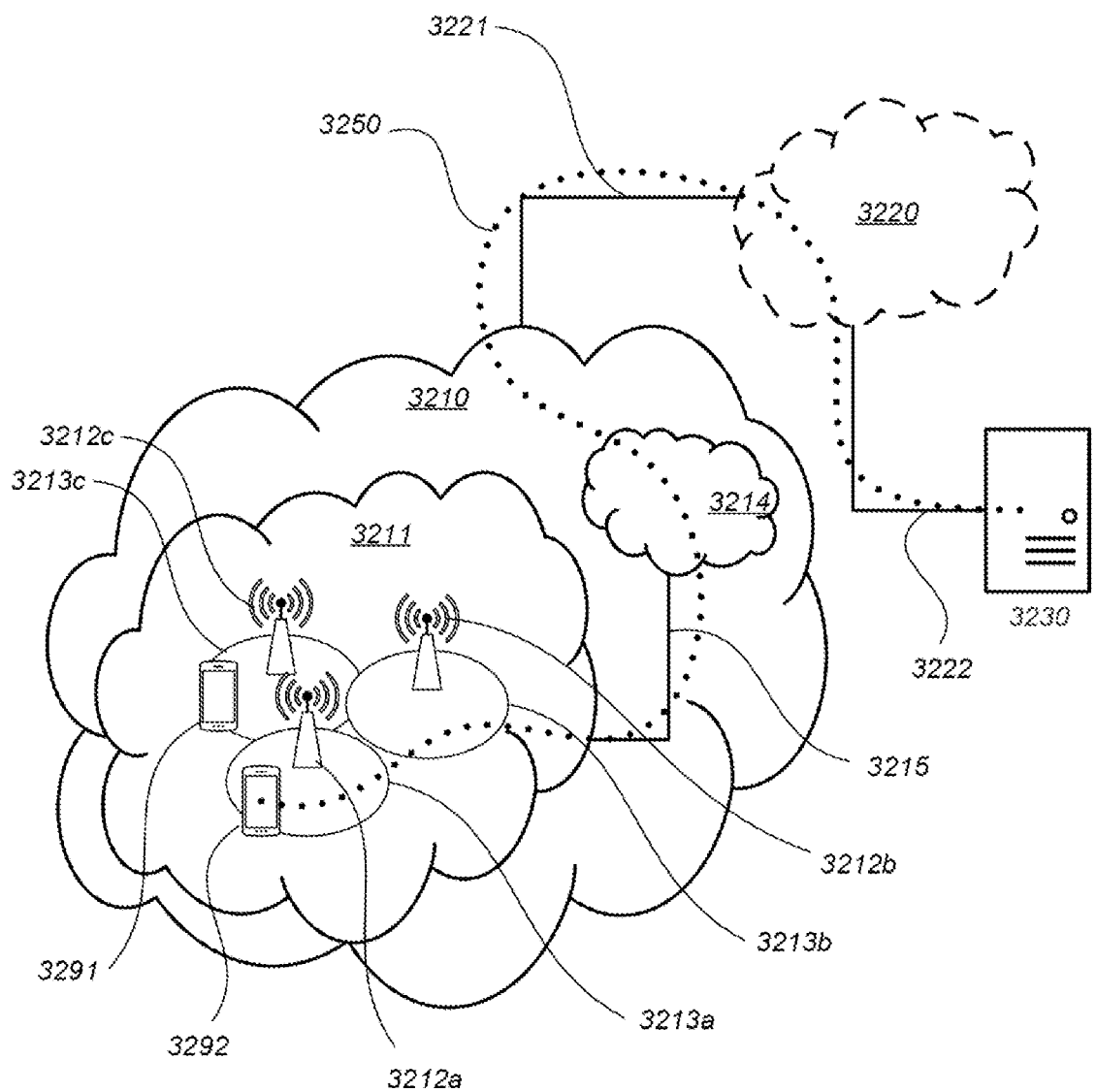

With reference to FIG. 11, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 11 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 12) served by the base station 3320. The communication interface 3326 may be configured to facilitate a connection 3360 to the host computer 3310. The connection 3360 may be direct or it may pass through a core network (not shown in FIG. 12) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 12:
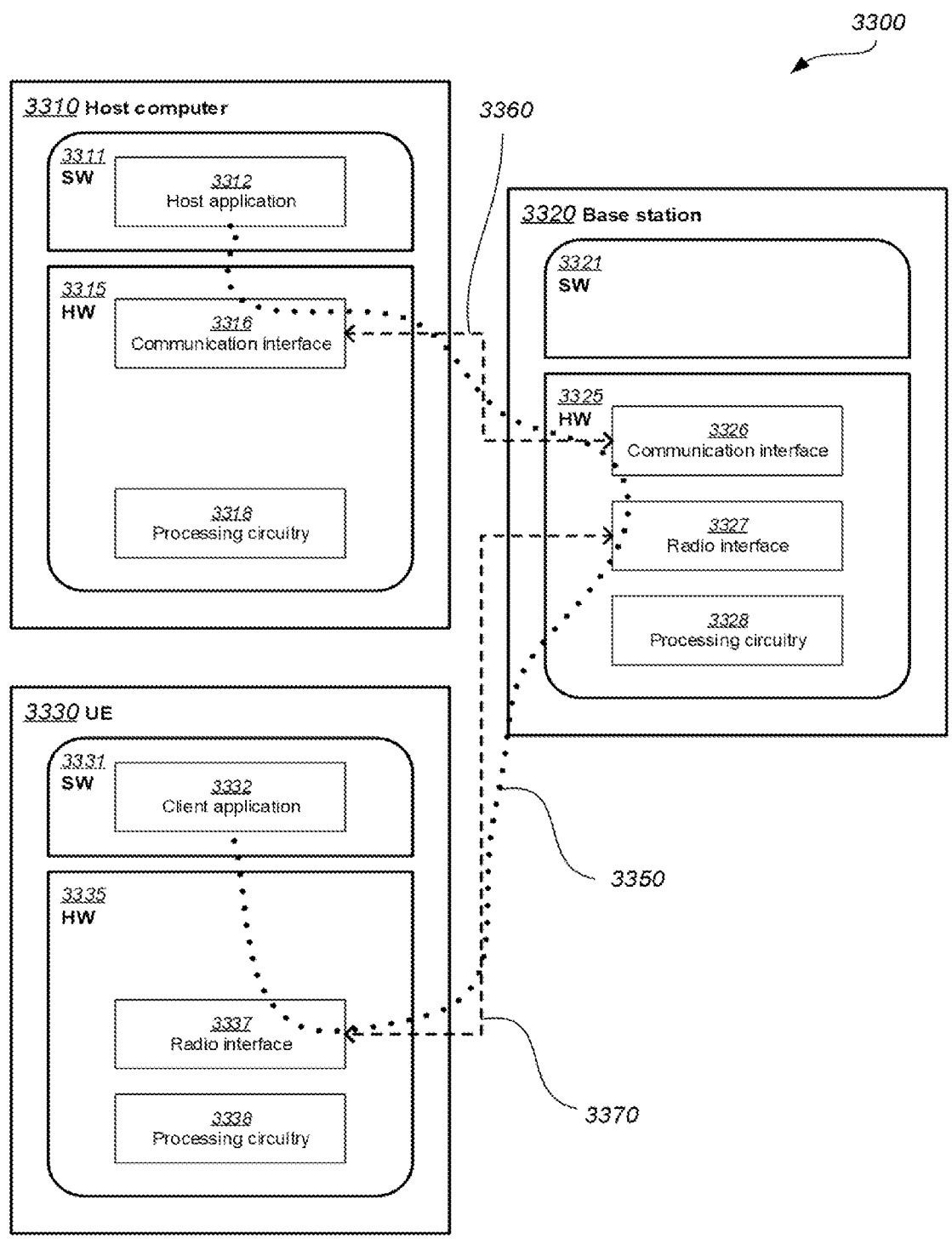

It is noted that the host computer 3310, base station 3320 and UE 3330 illustrated in FIG. 12 may be identical to the host computer 3230, one of the base stations 3212a, 3212b, 3212c and one of the UEs 3291, 3292 of FIG. 11, respectively. This is to say, the inner workings of these entities may be as shown in FIG. 12 and independently, the surrounding network topology may be that of FIG. 11.

In FIG. 12, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the efficiency in communication and thereby provide benefits such as better utilization of resources in the network.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In some embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 13 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 14 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 15:
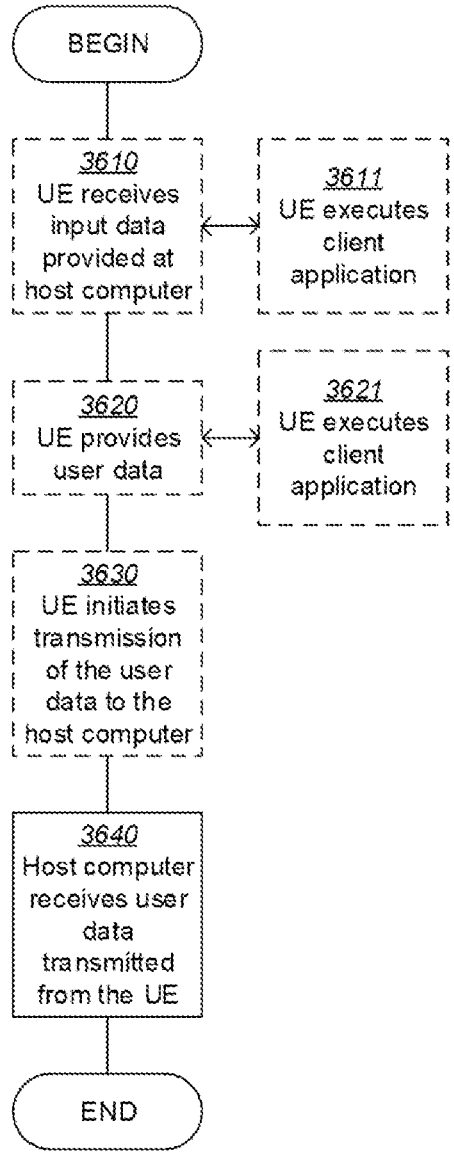

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 15 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 16:
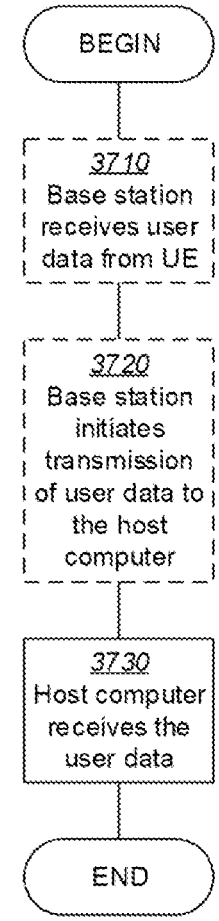

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 11 and 12. For simplicity of the present disclosure, only drawing references to FIG. 16 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a wireless device when operating in a wireless network, for handling handover from a source cell to a target cell when the wireless device has obtained and stored a handover configuration for at least one target cell X, the method comprising:
   performing cell selection upon detecting a communication failure,
   determining whether the selected cell is one of the at least one target cell X for which a handover configuration has been obtained and stored;
   initiating handover to one of the at least one target cell X when that target cell was selected in said cell selection, by applying the stored handover configuration of the selected cell, and
   initiating an RRC re-establishment procedure when none of the at least one target cell X was selected in said cell selection.

2. A method according to claim 1, wherein each stored handover configuration is a conditional handover configuration.

3. A method according to claim 1, wherein said communication failure comprises any of: handover failure, radio link failure, and failure to comply with a configuration for accessing the wireless network.

4. A method according to claim 1, wherein said communication failure is declared when a predefined timer expires, which timer has been started when the communication failure was first detected.

5. A method according to claim 1, wherein each stored handover configuration is an RRC configuration comprising an RRCReconfiguration with reconfigurationWithSync or an RRCConnectionReconfiguration with mobilityControlInfo.

6. A wireless device arranged to, when operating in a wireless network, handle handover from a source cell to a target cell when the wireless device has obtained and stored a handover configuration for at least one target cell X, wherein the wireless device is configured to:
   perform cell selection upon detecting a communication failure,
   determine whether the selected cell is one of the at least one target cell X for which a handover configuration has been obtained and stored,
   initiate handover to one of the at least one target cell X when that target cell was selected in said cell selection, by applying the stored handover configuration of the selected cell, and
   initiate an RRC re-establishment procedure when none of the at least one target cell X was selected in said cell selection.

7. A wireless device according to claim 6, wherein each stored handover configuration is a conditional handover configuration.

8. A wireless device according to claim 6, wherein said communication failure comprises any of: handover failure, radio link failure, and failure to comply with a configuration for accessing the wireless network.

9. A wireless device according to claim 6, wherein the wireless device is configured to declare said communication failure when a predefined timer expires, which timer has been started when the communication failure was first detected.

10. A wireless device according to claim 6, wherein each stored handover configuration is an RRC configuration comprising an RRCReconfiguration with reconfigurationWithSync or an RRCConnectionReconfiguration with mobilityControlInfo.

11. A computer program product comprising a non-transitory storage medium containing computer program instructions which, when executed on at least one processor, cause the at least one processor to carry out the method according to claim 1.

\* \* \* \* \*